(12) United States Patent
Stockmeyer

(10) Patent No.: US 7,191,311 B2
(45) Date of Patent: Mar. 13, 2007

(54) METHOD AND SYSTEM OF INTERCONNECTING PROCESSORS OF A PARALLEL COMPUTER TO FACILITATE TORUS PARTITIONING

(75) Inventor: Larry Stockmeyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 10/734,340

(22) Filed: Dec. 13, 2003

(65) Prior Publication Data

US 2005/0132163 A1 Jun. 16, 2005

(51) Int. Cl.
*G06F 15/173* (2006.01)
(52) U.S. Cl. ...................................................... 712/13
(58) Field of Classification Search ............. 712/10–22
See application file for complete search history.

(56) References Cited

U.S. PATENT DOCUMENTS 5,715,391 A * 2/1998 Jackson et al. ............... 712/11

OTHER PUBLICATIONS

Fujii, Tetsurou and Sadayasu Ono. Interconnection Network Switch Design for Parallel DSP Systems. IEEE: 1992.*
Reed, Daniel A. and Richard M. Fujimoto. Multiprocessor Networks: Message-Based Parallel Processing. MIT Press: 1987. p. 43, 46-52.*

* cited by examiner

*Primary Examiner*—Eddie Chan
*Assistant Examiner*—Ryan Fiegle
(74) *Attorney, Agent, or Firm*—Leonard T. Guzman

(57) ABSTRACT

The present invention provides a method and system of interconnecting L processors of a parallel computer to facilitate torus partitioning, (a) where each of the processors includes a processing unit and a switch, (b) where the switch includes a first external port, a second external port, a third external port, a fourth external port, a first internal port, and a second internal port, (c) where the L processors comprise R non-overlapping partitions, (d) where each of the partitions comprises the processing unit of at least one of the processors, and (e) where L is an integer $\geq 2$ and R is an integer $\geq 1$. In an exemplary embodiment, the method and system include connecting the L switches of the L processors among the external ports of the L switches in an extended torus architecture and setting the connected L switches thereby interconnecting each of the partitions as a torus.

6 Claims, 37 Drawing Sheets

METHOD AND SYSTEM OF INTERCONNECTING PROCESSORS OF A PARALLEL COMPUTER TO FACILITATE TORUS PARTITIONING

FIELD OF THE INVENTION

The present invention relates to parallel computers, and particularly relates to a method and system of interconnecting processors of a parallel computer to facilitate torus partitioning.

BACKGROUND OF THE INVENTION

With the declining cost of computer hardware, such as microprocessors and memory, and the increasing complexity of problems that require solution by a computer, parallel computing is becoming increasingly important. Parallel computers typically use tightly coupled multiprocessors, a collection of microprocessors that are interconnected by cables and run under a single operating system. This is in contrast to loosely coupled multicomputers where several uniprocessor computers, each having its own operating system, are connected in a network (such as Ethernet).

Tightly Coupled Processor

For reasons of efficiency, the hardware of a single microprocessor (hereinafter "processor") in a tightly coupled multiprocessor is usually divided into the following two parts:

(1) a processing unit (hereinafter the "PU") that is used to execute the operations of a program being run on the parallel computer containing the multiprocessor; and (2) a switch that is used to handle communication between the processor and other processors in the computer.

In each processor, the PU and the switch are logically coupled. Typically, the PU and the switch are electrically coupled.

Switch

Each switch has a certain number of external ports and internal ports. FIG. 1A illustrates a prior art processor 110 divided into a PU 112 and a switch 114, where switch 114 includes four external ports labeled E1, E2, E3, and E4, and two internal ports labeled I1 and I2. An external port of one switch can be connected to an external port of another switch by a cable. Only one cable can be connected to each external port. It is possible that an external port has no cable connected to it. The two internal ports, I1 and I2, connect the switch, such as switch 114, to the PU, such as PU 112. A switch has the capability of making internal connections between pairs of its own (internal and external) ports, thus making cable connections between different PUs.

A typical switch 114 includes at least four external ports, at least two internal ports, and the switching capability of a full crossbar, such that given an arbitrary pairing of the ports of the switch, the switch can be set to connect the two ports in each pair.

Switch Connections

Switches may be interconnected. For example, prior art FIG. 1B shows two processors (PU/switch combinations) 110 and 120, where processor 120 includes a PU 122 and a switch 124. Switch 114 is set to connect ports E1 and I1 and to connect ports E4 and I2, as shown in FIG. 1B. Switch 124 is set to connect ports E1 and I1, to connect ports E2 and I2, and to connect ports E3 and E4, as shown in FIG. 1B. Also shown is a cable 130 between port E4 of switch 114 and port E1 of switch 124. As a result, port I2 of switch 114 is connected to port I1 of switch 124, thus connecting the two PUs.

A connection between ports J and K is represented by the pair (J,K). A setting of a switch is a set of connections between its ports, such that each port appears in at most one connection pair. For example, the setting of switch 114 in FIG. 1B is represented by the set {(E1,I1), (E4,I2)}. The setting of switch 124 in this figure is represented by the set {(E1,I1), (E2,I2), (E3,E4)}.

The set of connections may be empty, indicating that no ports of the switch are connected to one another. Connections can be dynamically added to and removed from a switch setting. A connection can be removed at any time.

A connection can be added if and only if it does not use a port of the switch that is already in use by an existing connection. For example, the connection (E2,E3) can be added to the setting {(E1,I1), (E4,I2)} of switch 114 in FIG. 1B. But the connection (E1,E3) cannot be added because port E1 is already in use by the connection (E1,I1) in the setting for switch 114 in FIG. 1B.

Interconnection Architecture

Due to physical constraints, each switch can have only a small number of ports, so a switch (and therefore its PU) can be directly connected to only a small number of other switches (PUs). It is possible that, due to both physical and electrical constraints, the length of each cable cannot exceed some specified amount. The way that the cables are placed between external ports forms the interconnection architecture of the computer: the placement of these cables is fixed. (Although the cables might be pluggable into the ports, if the placement of the cables is changed then this would constitute another interconnection architecture.)

Cellular Structure

The processors are typically arranged in a regular structure, often called a cellular structure. In one very common cellular structure, the processors are placed at the cells of a 1-, 2-, or 3-dimensional array. An array is defined by specifying the length of the computer in each dimension, where the length is given by the number of processors. In the case of a 2-dimensional array, for example, and naming the two dimensions X and Y, the array is specified by the length $L_X$ in the X dimension and the length $L_Y$ in the Y dimension. The array contains a total of $L_X \times L_Y$ processors. For example, FIG. 1C shows a 2-dimensional array 140 with $L_X=5$ and $L_Y=4$ containing a total of 20 processors. Each processor in the array is identified by its coordinates in the array, as shown in FIG. 1C. These coordinates also identify the PU and the switch comprising the processor. In a 3-dimensional array, each processor (PU and switch) is identified by a triple (x,y,z) giving the coordinates of the processor in the X-, Y-, and Z-dimension, respectively.

Connecting External Ports of Switches

An interconnection architecture of the computer specifies the way that cables are placed between external ports of switches. Typically the cabling is done for each dimension separately. In the case of a 3-dimensional array, for example, the switch is divided into an X-switch, a Y-switch, and a Z-switch, each having its own four external ports and two internal ports. A cable can connect an external port of one switch to an external port of another switch only if the two switches have the same dimension (e.g. both are X-switches).

Again in keeping with the separation of dimensions, the computer is divided into 1-dimensional "lines" in each dimension. Within a line, all coordinates except one have a constant value, while the non-constant coordinate ranges over all possible values of that coordinate. For example, FIG. 1D shows the X-line 152 where the coordinate y is fixed at 1 and shows the Y-line 154 where the x coordinate is fixed at 4.

In order that the computer have a simple and regular structure, and using dimension X as an example, cables are placed only between switches that belong to the same X-line, and all X-lines in the computer typically have the same cabling structure. For example, in a 3-dimensional computer of length $L_X$ by $L_Y$ by $L_Z$, a cabling for the X dimension (the cables to be placed between X-switches belonging to the same X-line) is specified by a cabling of one line having length $L_X$. The cabling of this one line is replicated for all X-lines in the computer. Thus, to specify a cabling architecture for a "regular" computer of this type, it suffices to specify three cablings, one for a line of length $L_X$, one for a line of length $L_Y$, and one for a line of length $L_Z$.

Mesh and Torus Interconnection Architectures

Two common, prior art interconnection architectures are the mesh architecture and the torus architecture. For example, as shown in FIG. 1E, a prior art mesh architecture 160 shown includes switches 161, 162, 163, 164, 165, 166, 167, and 168. Also, for example, as shown in FIG. 1F, a prior art torus architecture 170 includes switches 171, 172, 173, 174, 175, 176, 177, and 178.

Again using dimension X as an example, in mesh architecture 160, the X-switches in an X-line are connected in a linear fashion, namely switches 161, 162, 163, 164, 165, 166, 167, and 168. In torus architecture 170, the X-switches are connected in a cyclic fashion, namely 171, 173, 175, 177, 178, 176, 174, 172, and back to 171. Although FIGS. 1E and 1F show a mesh and a torus for a line of length eight, it is clear how these can be extended for a line of arbitrary length.

Torus architecture 170 could be obtained from mesh architecture 160 by adding a cable between switch 161 and switch 168. However, this would likely violate a limitation on the length of a cable. To keep the cables short, the cycle is "folded" as shown in FIG. 1F.

Mesh and torus architectures are defined for 2- and 3-dimensional arrays by replicating the mesh and torus cabling of a line in FIGS. 1E and 1F to all the X-lines, Y-lines, and Z-lines in the computer, respectively.

Partitioning

One important factor in the usefulness of an interconnection architecture is the flexibility it has to partition the computer into several independent pieces. Partitioning is important to allow several programs, or "jobs", to run on the computer simultaneously. When initiating the running of a job, a user specifies a "partition", the part of the computer that will be dedicated to this job. A "user" can be either a human user or a part of the system software such as a job scheduler. A partition of a computer is a set of PUs that are being used by one job.

Specifying PUs

A partition P is specified by giving, for each dimension, a set $P_X$ of coordinates in the X dimension, a set $P_Y$ of coordinates in the Y-dimension, and a set $P_Z$ of coordinates in the Z-dimension. Then the PU with coordinates (x,y,z) belongs to partition P if and only if x belongs to $P_X$ and y belongs to $P_Y$ and z belongs to $P_Z$. In other words, the set of coordinates of the PUs is the Cartesian product of $P_X$, $P_Y$, and $P_Z$. For example, in an 8-by-8-by-8 3-dimensional computer, a user might specify a partition by the set $P_{X=\{3,4\}}$ in the X-dimension, the set $P_Y=\{3,5\}$ in the Y-dimension, and the set $P_Z=\{1\}$ in the Z-dimension. The PUs that belong to this partition are the PUs with coordinates (3,3,1), (3,5,1), (4,3,1) and (4,5,1).

Partitions are formed and released dynamically as jobs start and finish, respectively. To prevent one job from interfering with another job, different jobs cannot use the same PU and different jobs cannot use the same cable. Different jobs can use the same switch, but the use of a switch is restricted by the requirement that different jobs cannot use the same PU or cable.

Specifying Connection Type

In addition to specifying the PUs in the partition, the user also specifies a connection type, or architecture, for the partition. Two very common connection types are the mesh architecture and the torus architecture. Specifying a connection type reflects the fact that if the user has obtained a partition of a computer, the user would like his or her partition to "look like" a smaller version of the entire computer.

Mesh Architecture

The mesh architecture, such as mesh architecture 160, has the desirable property that every partition can be interconnected as a (in general, smaller) mesh by setting the switches properly. For example, FIG. 1G shows how the switches would be set so that the partition {163,164,166,167} is interconnected as a prior art mesh via connections 180, 181, 182, 183, 184, 185, 186, 187, 188, 189, and 190. More specifically, FIG. 1G shows how the switches would be set so that the partition {163,164,166,167} is interconnected as a prior art mesh via internal couplings 180, 182, 183, 185, 187, 188, and 190 and external connections 181, 184, 186, and 189. FIG. 1G also illustrates that a connection between two PUs, such as PUs 164 and 166, can be made by two or more external connections in series, such as external connections 184 and 186. PU 165 may be "skipped" if PU 165 (a) belonged to another existing partition or (b) was faulty. An external connection may be implemented with a cable, an optical fiber, or another types of electromagnetic coupling.

In greater generality, a multiplicity of partitions can exist simultaneously, with each one interconnected as a mesh, provided that two different partitions do not "overlap". More precisely, define the span of a 1-dimensional partition (a set of coordinates) to be the set of coordinates lying between and including the smallest coordinate in the partition and the largest coordinate in the partition. For example, the span of the partition {163,164,166,167} is {163,164,165,166,167}. The requirement that two partitions do not overlap is that their spans do not contain a coordinate in common.

Overlapping partitions in the multiple-dimension setting are generalizations of 1-dimensional case overlapping partitions. In the case of three dimensions, for example, if a 3-dimensional partition P is defined by the Cartesian product of the sets of $P_X$, $P_Y$, and $P_Z$ of coordinates, then the span of P is the Cartesian product of the span of $P_X$, the span of $P_Y$, and the span of $P_Z$. Two 3-dimensional partitions P and Q overlap if the span of P and the span of Q contain a coordinate in common. If P is defined by $P_X$, $P_Y$, and $P_Z$, and if Q is defined by $Q_X$, $Q_Y$, and $Q_Z$, then P and Q overlap if either $P_X$ and $Q_X$ overlap, or $P_Y$ and $Q_Y$ overlap, or $P_Z$ and $Q_Z$ overlap.

Torus Architecture

The torus architecture, such as torus architecture 170 in FIG. 1F, does not have the desirable property that every partition in a multiplicity of non-overlapping partitions can be made to have the interconnection structure of a (smaller) torus. As illustration, this holds for any two partitions of size two or more. For example, the partition {171,172} can be interconnected as a torus, but only by using all of the cables in the line. Therefore, this partition cannot exist simultaneously with any torus-interconnected partition of size at least two, for example, {176,177}.

Number of Connections Used

With $P_X$ being a partition of an X-line, and with $N_X$ being the number of coordinates in $P_X$, if $N_X \geq 2$, any torus interconnection of $P_X$ uses at least $N_X$ external connections, or cables, in the X-line. The same fact holds for the Y and Z dimensions.

Interval Partition

A 1-dimensional partition P of a line is an interval partition if P is a set of consecutive coordinates, such as {173,174,175,176,177}. A 3-dimensional partition P of an array is an interval partition if $P_X$, $P_Y$, and $P_Z$ are all 1-dimensional interval partitions. P is an interval partition if and only if the span of P is the same as P itself.

Therefore, a method and system of interconnecting processors of a parallel computer to facilitate torus partitioning is needed.

SUMMARY OF THE INVENTION

The present invention provides a method and system of interconnecting L processors of a parallel computer to facilitate torus partitioning, (a) where each of the processors includes a processing unit and a switch, (b) where the switch includes a first external port, a second external port, a third external port, a fourth external port, a first internal port, and a second internal port, (c) where the L processors comprise R non-overlapping partitions, (d) where each of the partitions comprises the processing unit of at least one of the processors, and (e) where L is an integer $\geq 2$ and R is an integer $\geq 1$. In an exemplary embodiment, the method and system include (1) connecting the L switches of the L processors among the external ports of the L switches in an extended torus architecture and (2) setting the connected L switches thereby interconnecting each of the partitions as a torus.

In an exemplary embodiment, the connecting includes coupling the first external port of switch 1 and the first external port of switch 2. In a further embodiment, the connecting includes (a) if $L \geq 3$, connecting the fourth external port of the (L−1)th switch and the fourth external port of the Lth switch, (b) for $1 \leq i \leq L−1$, where i is an integer, connecting the third external port of the ith switch and the second external port of the (i+1)th switch, and (c) for $1 \leq i \leq L−2$, where i is an integer, connecting the fourth external port of the ith switch and the first external port of the (i+2)th switch. In a particular embodiment, the connecting includes connecting the L switches via cables.

In an exemplary embodiment, the setting includes computing the span of the partition. In an exemplary embodiment, the computing includes (a) finding the minimum coordinate, MIN, in the partition, (b) determining the maximum coordinate, MAX, in the partition, and (c) setting the span of the partition to be equal to the set of coordinates i, where $MIN \leq i \leq MAX$, where i is an integer. In a further embodiment, the computing includes if the span of the partition contains exactly one coordinate, where i is the coordinate that belongs to the span, connecting the first internal port and the second internal port (I1,I2) of the ith switch.

In a further embodiment, the computing includes if the span of the partition contains exactly two coordinates, where i and i+1 are the two coordinates that belong to the span, (1) if i=1, (a) connecting the third external port and the second internal port (E3,I2) of the first switch, (b) connecting the first external port and the first internal port (E1,I1) of the first switch, (c) connecting the second external port and the second internal port (E2,I2) of the second switch, and (d) connecting the first external port and the first internal port (E1,I1) of the second switch, (2) if i=L−1, (a) connecting the third external port and the first internal port (E3,I1) of the (L−1)th switch, (b) connecting the fourth external port and the second internal port (E4,I2) of the (L−1)th switch, (c) connecting the second external port and the first internal port (E2,I1) of the Lth switch, and (d) connecting the fourth external port and the second internal port (E4,I2) of the Lth switch, and (3) otherwise, where $2 \leq i \leq L−2$, (a) connecting the third external port and the fourth external port (E3,E4) of the (i−1)th switch, (b) connecting the second external port and the first internal port (E2,I1) of the ith switch, (c) connecting the third external port and the second internal port (E3,I2) of the ith switch, (d) connecting the first external port and the first internal port (E1,I1) of the (i+1)th switch, and (e) connecting the second external port and the second internal port (E2,I2) of the (i+1)th switch.

In a further embodiment, the computing includes if the span of the partition contains exactly three coordinates, where i, i+1, and i+2 are the three coordinates that belong to the span, (1) connecting the third external port and the first internal port (E3,I1) of the ith switch, (2) connecting the fourth external port and the second internal port (E4,I2) of the ith switch, (3) connecting the first external port and the first internal port (E1,I1) of the (i+2)th switch, (4) connecting the second external port and the second internal port (E2,I2) of the (i+2)th switch, (5) if (i+1) belongs to the partition, (a) connecting the second external port and the first internal port (E2,I1) of the (i+1)th switch and (b) connecting the third external port and the second internal port (E3,I2) of the (i+1)th switch, and (6) if (i+1) does not belong to the partition, connecting the second external port and the third external port (E2,E3) of the (i+1)th switch.

In a further embodiment, the computing includes if the span of the partition contains at least four coordinates, for each coordinate i such that $MIN \leq i \leq MAX$, (1) if i=MIN, (a) connecting the third external port and the first internal port (E3,I1) of the ith switch and (b) connecting the fourth external port and the second internal port (E4,I2) of the ith switch, (2) if i=MAX, (a) connecting the first external port and the first internal port (E1,I1) of the ith switch and (b) connecting the second external port and the second internal port (E2,I2) of the ith switch, (3) if i=MIN+1 and i belongs to the partition, (a) connecting the second external port and the first internal port (E2,I1) of the ith switch and (b) connecting the fourth external port and the second internal port (E4,I2) of the ith switch, (4) if i=MIN+1 and i does not belong to the partition, connecting the second external port and the fourth external port of the ith switch, (5) if i=MAX−1 and i belongs to the partition, (a) connecting the first external port and the first internal port (E1,I1) of the ith switch and (b) connecting the third external port and the second internal port (E3,I2) of the ith switch, (6) if i=MAX−1 and i does not belong to the partition, connecting the first external port and the third external port (E1,E3) of the ith switch, (7) if $MIN+2 \leq i \leq MAX−2$ and i belongs to the partition, (a) connecting the first external port and the first internal port (E1,I1) of the ith switch and (b) connecting the fourth external port and the second internal port (E4,I2) of the ith switch, and (8) if $MIN+2 \leq i \leq MAX−2$ and i does not belong to the partition, connecting the first external port and the fourth external port (E1,E4) of the ith switch.

In an exemplary embodiment, the method and system include connecting the L switches of the L processors among the external ports of the L switches in an extended torus architecture. In an exemplary embodiment, the connecting includes connecting the first external port of switch 1 and the first external port of switch 2. In a further embodiment, the connecting includes (a) if $L \geq 3$, connecting the fourth external port of the (L−1)th switch and the fourth external port of the Lth switch, (b) for $1 \leq i \leq L−1$, where i is an integer, connecting the third external port of the ith switch and the second external port of the (i+1)th switch, and (c) for $1 \leq i \leq L−2$, where i is an integer, connecting the fourth external port of the ith switch and the first external port of the (i+2)th switch. In a particular embodiment, the connecting includes connecting the L switches via cables. In a further embodiment, the method and system include setting the connected L switches thereby interconnecting each of the partitions as a torus.

The present invention provides a method and system of interconnecting L processors of a parallel computer to facilitate torus partitioning, (a) where each of the processors includes a processing unit and a switch, (b) where the switch includes a first external port, a second external port, a third external port, a fourth external port, a first internal port, and a second internal port, (c) where the L processors comprise R non-overlapping partitions, (d) where each of the partitions comprises the processing unit of at least one of the processors, (e) where L is an integer $\geq 2$ and R is an integer $\geq 1$, and (f) where the L switches of the L processors among the external ports of the L switches are connected in an extended torus architecture. In an exemplary embodiment, the method and system include setting the connected L switches thereby interconnecting each of the partitions as a torus.

The present invention provides a computer program product usable with a programmable computer having readable program code embodied therein of interconnecting L processors of a parallel computer to facilitate torus partitioning, where each of the processors comprises a processing unit and a switch, where the switch comprises a first external port, a second external port, a third external port, a fourth external port, a first internal port, and a second internal port, where the L processors comprise R non-overlapping partitions, where each of the partitions comprises the processing unit of at least one of the processors, and where L is an integer $\geq 2$ and R is an integer $\geq 1$. In an exemplary embodiment, the computer program product includes (1) computer readable code for connecting the L switches of the L processors among the external ports of the L switches in an extended torus architecture and (2) computer readable code for setting the connected L switches thereby interconnecting each of the partitions as a torus.

THE FIGURES

FIG. 1C is a diagram of a prior art array.

DETAILED DESCRIPTION OF THE INVENTION

The present invention provides a method and system of interconnecting processors of a parallel computer to facilitate torus partitioning. In an exemplary embodiment, the method and system utilizes the free external ports of the switches in a mesh architecture, such as mesh architecture 160, and a torus architecture, such as torus architecture 170, to obtain an interconnection architecture having a useful property that the mesh and torus architectures do not have. In an exemplary embodiment, the present invention provides a method and system of interconnecting L processors of a parallel computer to facilitate torus partitioning, (a) where each of the processors includes a processing unit and a switch, (b) where the switch includes a first external port, a second external port, a third external port, a fourth external port, a first internal port, and a second internal port, (c) where the L processors comprise R non-overlapping partitions, (d) where each of the partitions comprises the processing unit of at least one of the processors, and (e) where L is an integer $\geq 2$ and R is an integer $\geq 1$. In an exemplary embodiment, the method and system include (1) connecting the L switches of the L processors among the external ports of the L switches in an extended torus architecture and (2) setting the connected L switches thereby interconnecting each of the partitions as a torus.

Figure 6:
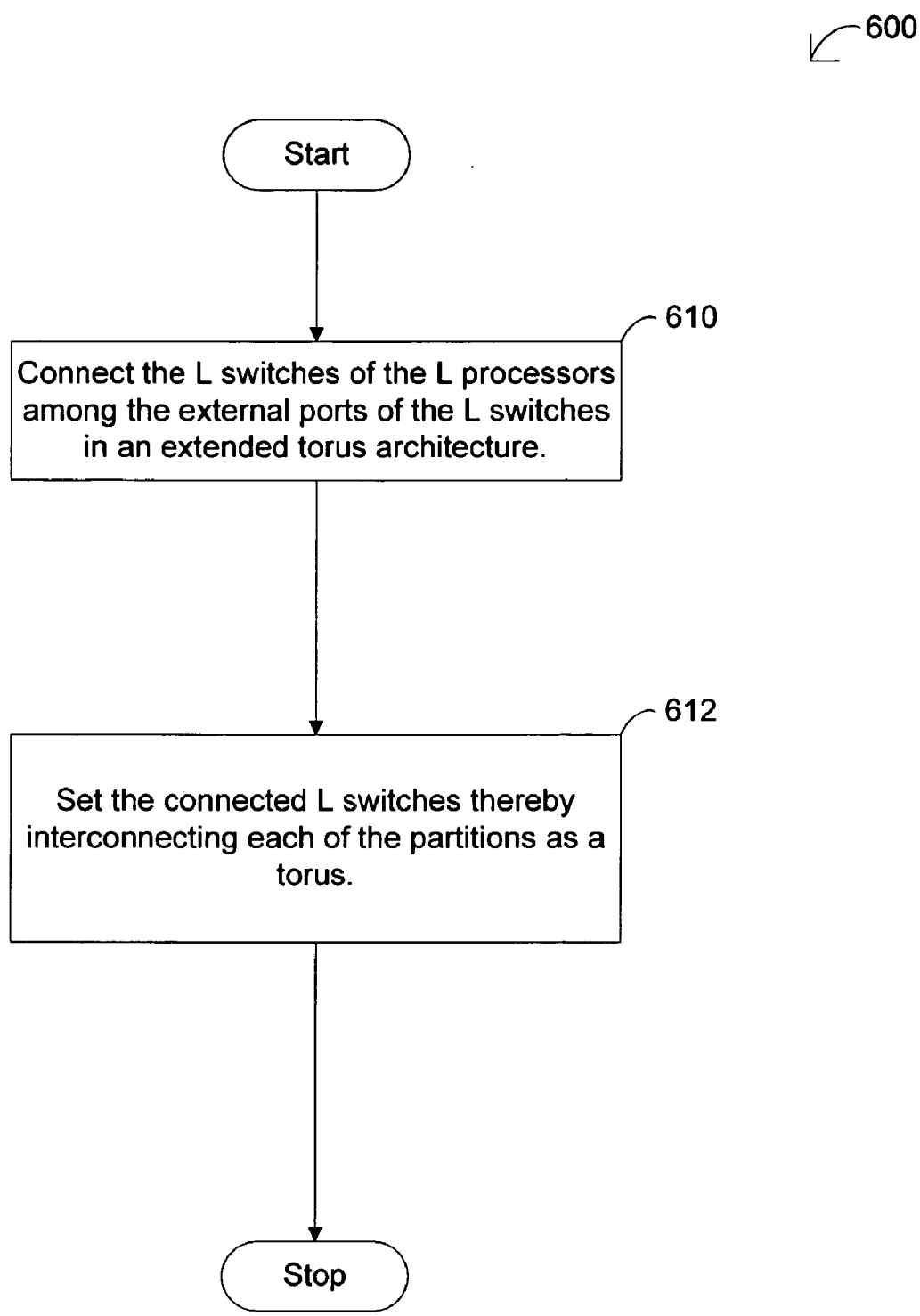
FIG. 6 is a flowchart in accordance with an exemplary embodiment of the present invention.

Referring to FIG. 6, in an exemplary embodiment, the present invention includes a step 610 of connecting the L switches of the L processors among the external ports of the L switches in an extended torus architecture and a step 612 of setting the connected L switches thereby interconnecting each of the partitions as a torus.

Interconnecting Switches

Figure 1A:
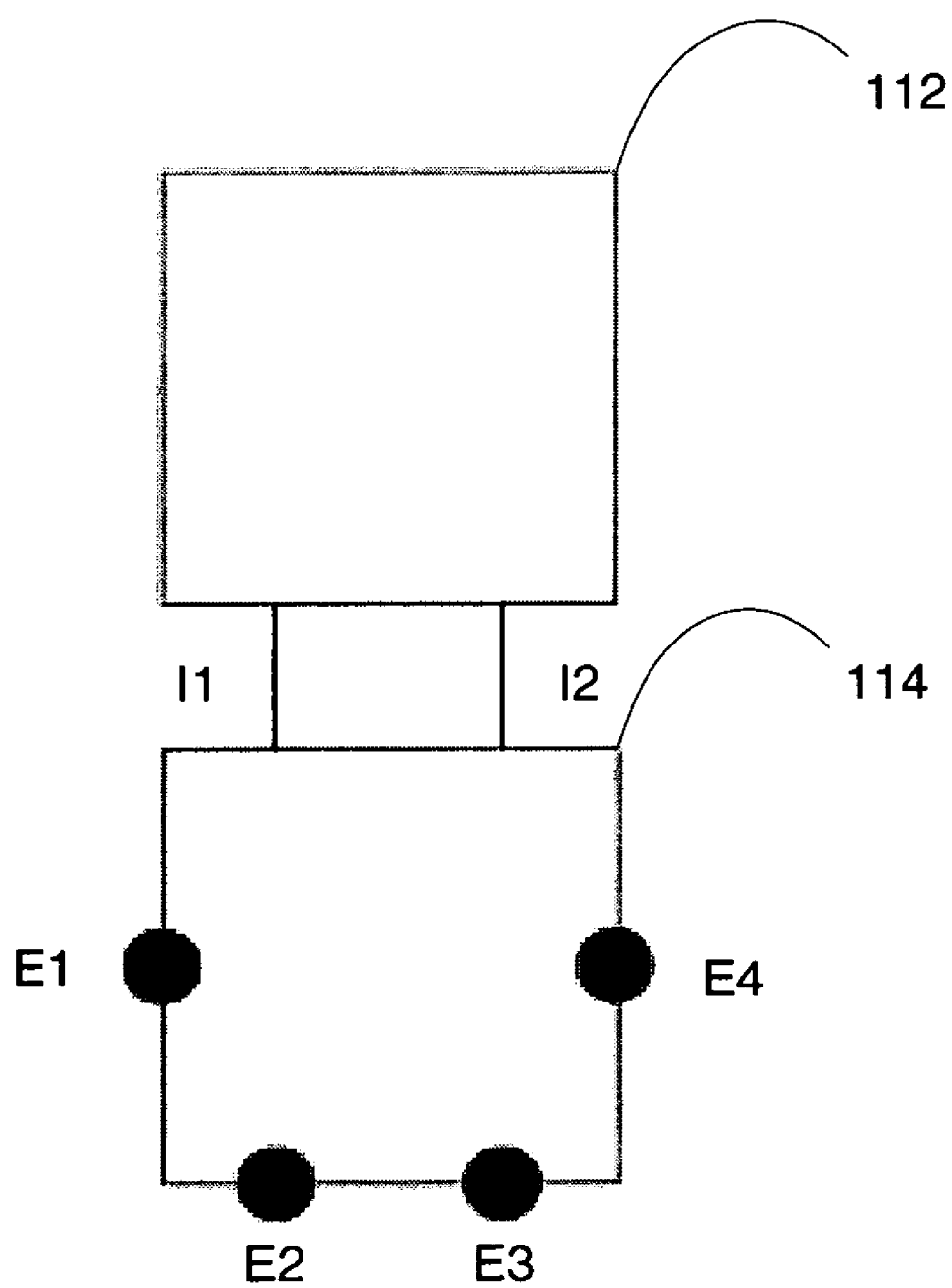
FIG. 1A is a block diagram of a prior art processor.
Figure 1B:
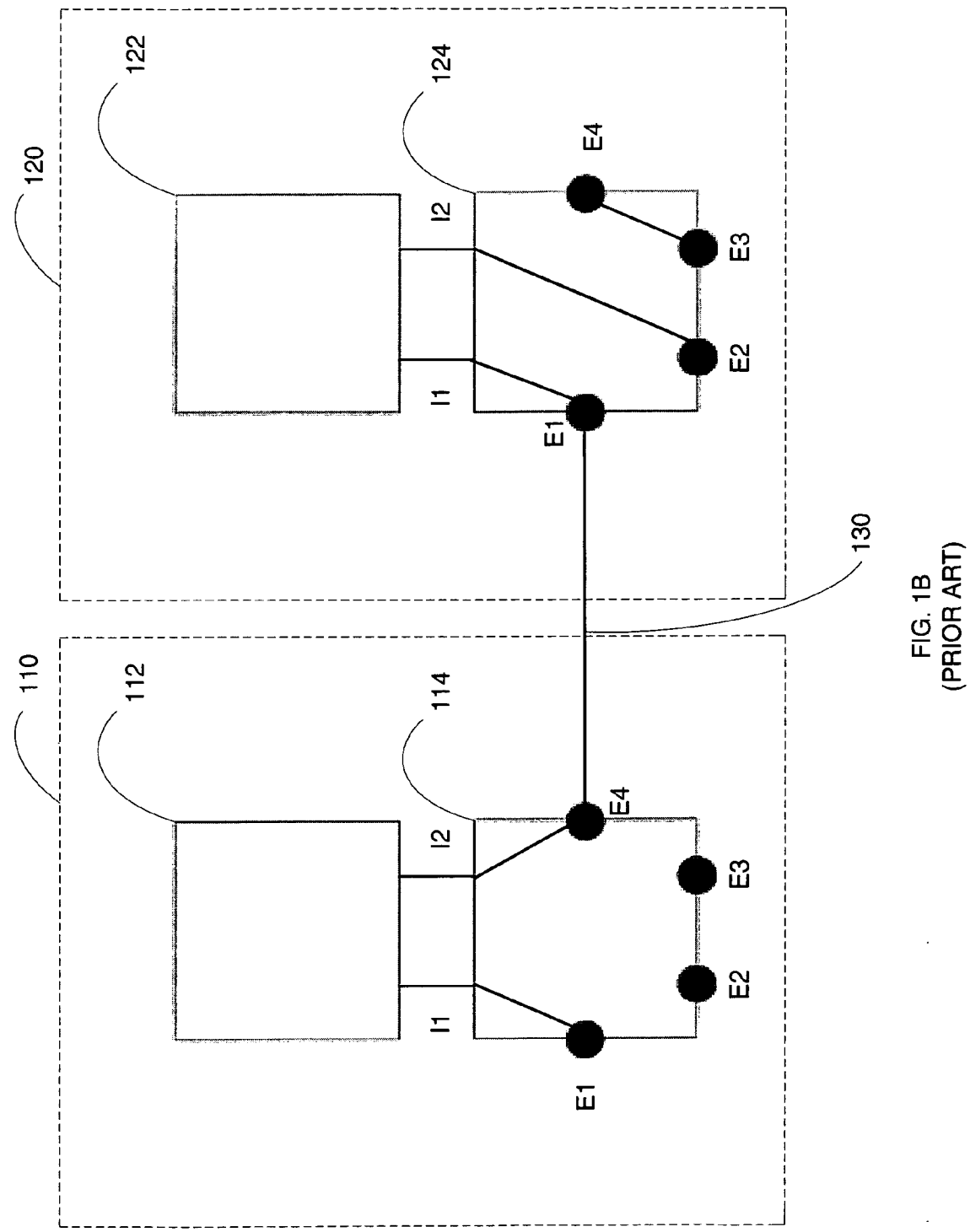
FIG. 1B is a block diagram of a prior art interconnection of two prior art processors.
Figure 1D:
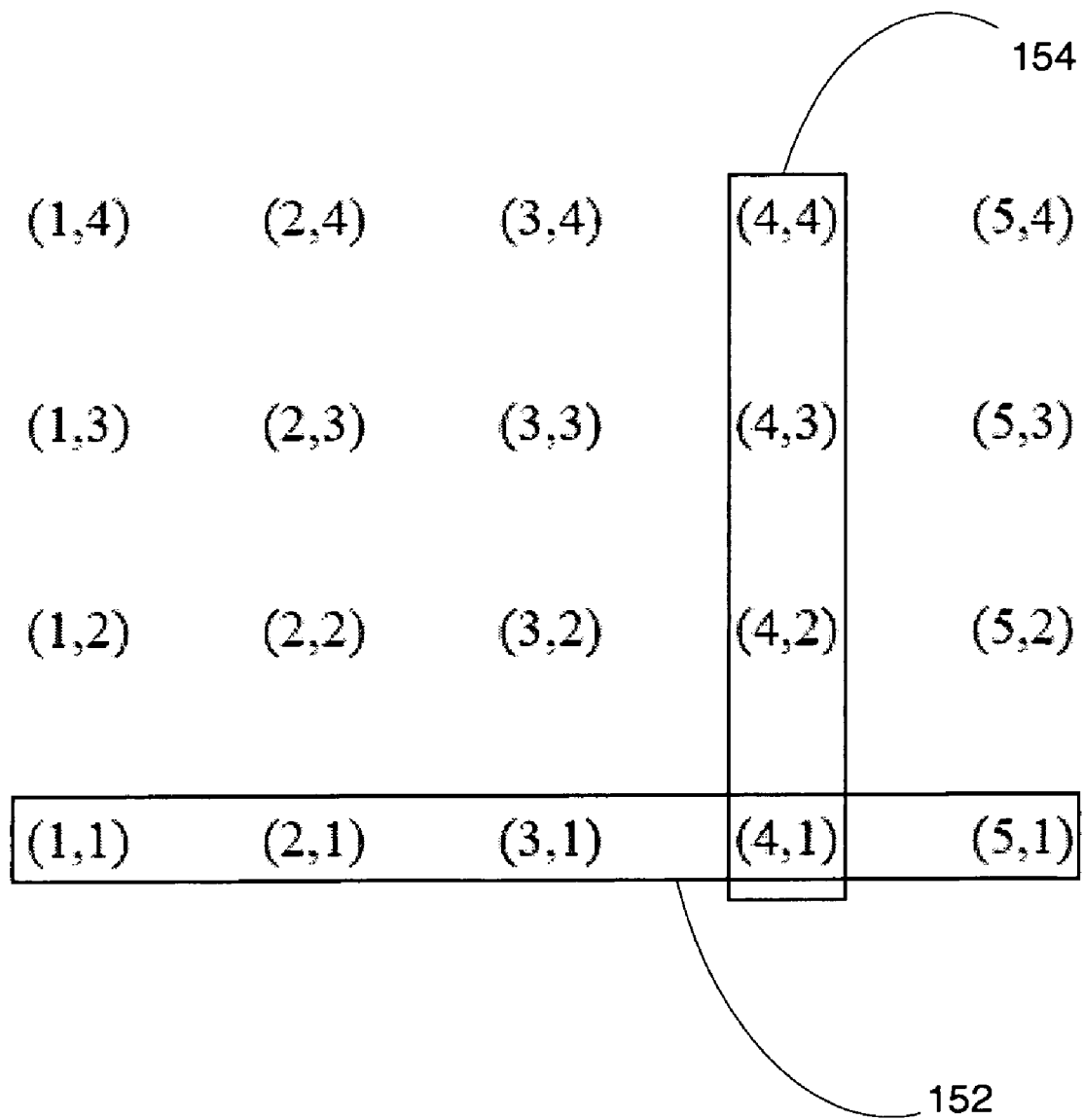
FIG. 1D is a diagram of a prior art array.
Figure 1E:
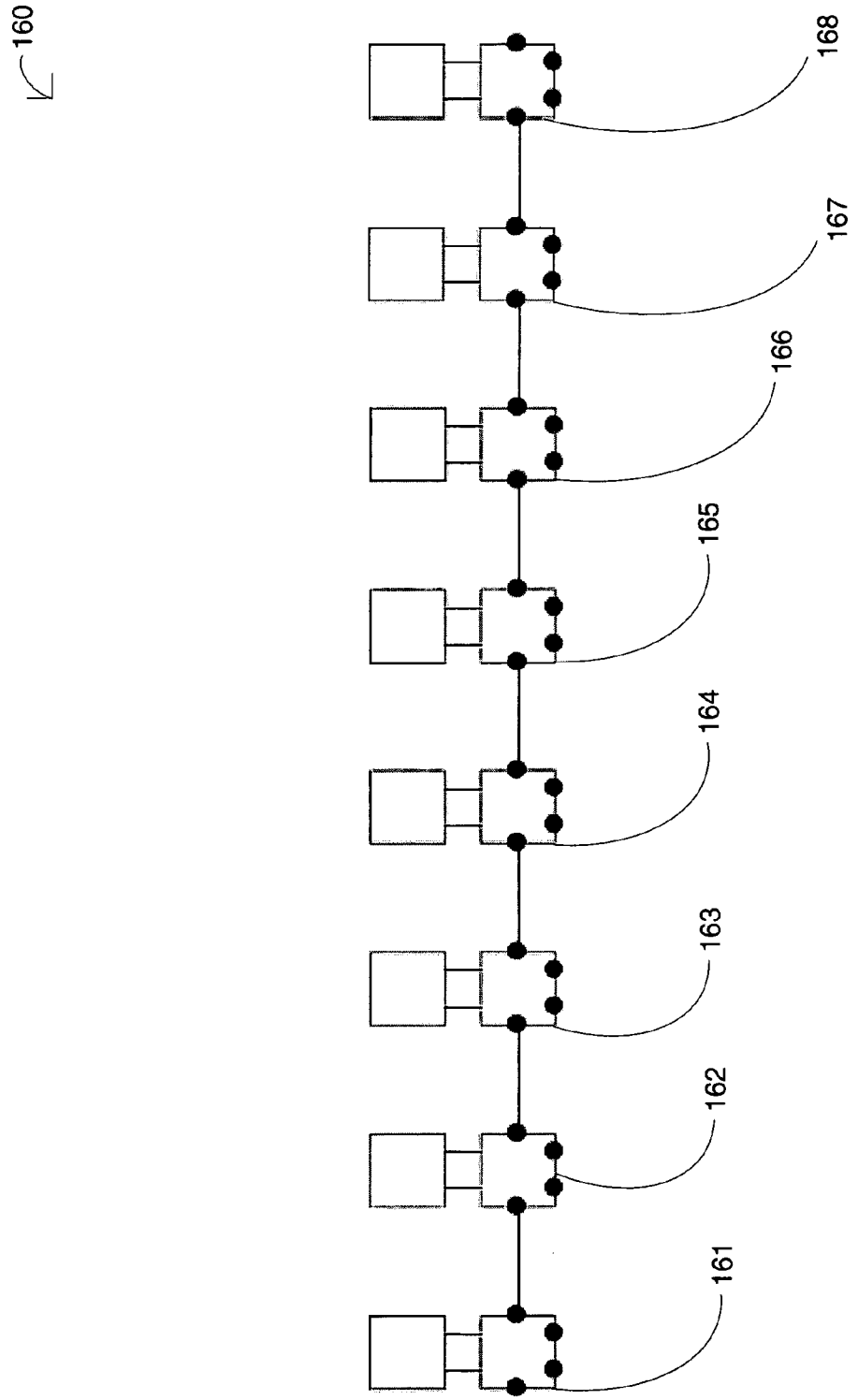
FIG. 1E is a block diagram of a prior art mesh interconnection architecture.
Figure 1F:
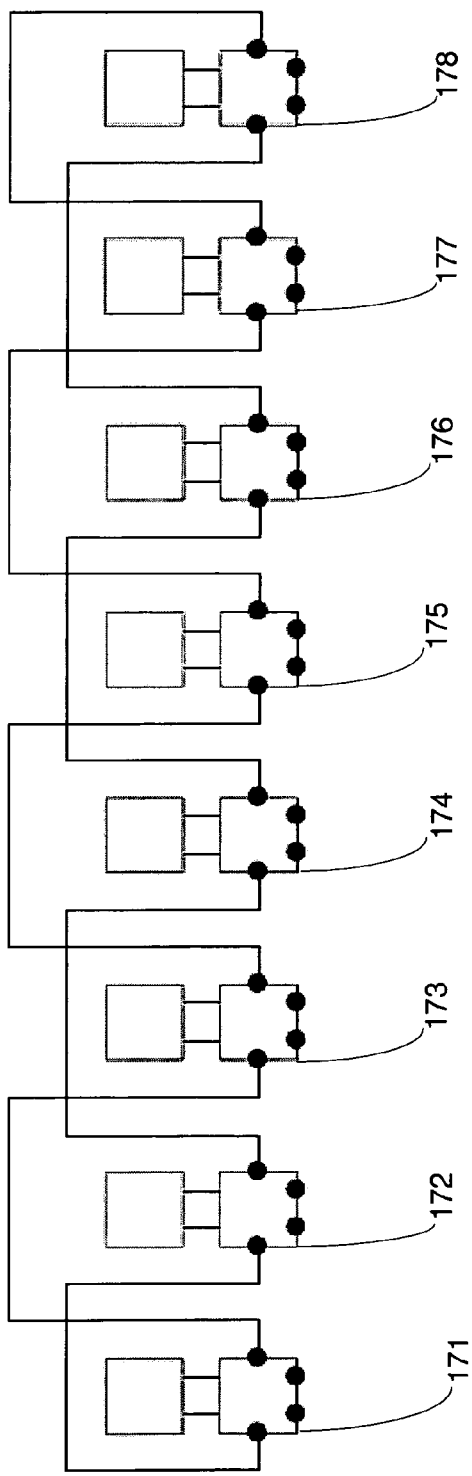
FIG. 1F is a block diagram of a prior art torus interconnection architecture.
Figure 1G:
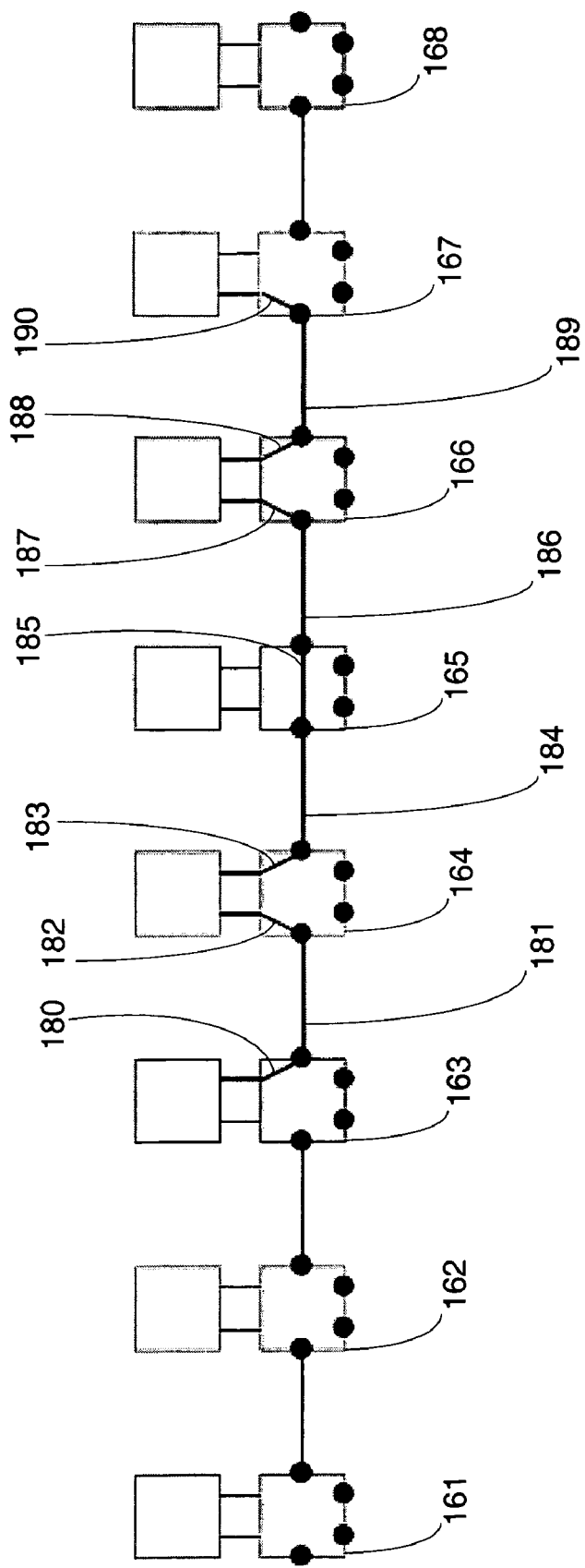
FIG. 1G is a block diagram of a prior art mesh interconnection architecture.
Figure 2:
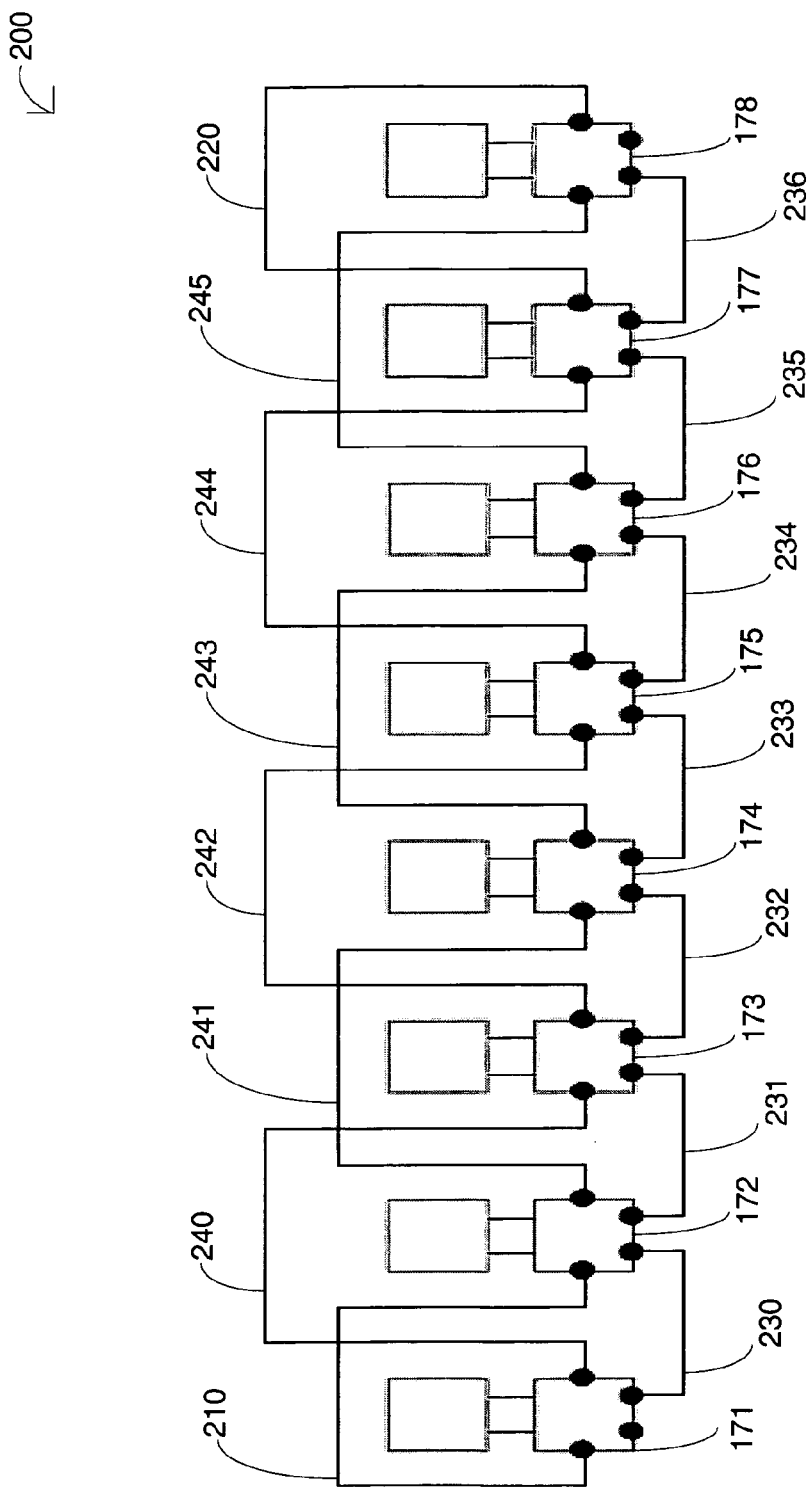
FIG. 2 is a block diagram of an extended torus architecture in accordance with an exemplary embodiment of the present invention.

In an exemplary embodiment, the method and system includes interconnecting L switches among external ports of the switches in an extended torus architecture 200, as shown in exemplary FIG. 2 for an exemplary line of length L=8 processors with their eight corresponding PUs and eight corresponding switches 171, 172, 173, 174, 175, 176, 177, and 178, where L is an integer $\geq 2$. In an exemplary embodiment, the switches are interconnected by cables.

In an exemplary embodiment, the method and system connects external ports for all of the switches. In an exemplary embodiment, the method and system connects port E1 of a switch 1, such as switch 171, and port E1 of a switch 2, such as switch 172, as exemplified by connection 210 in FIG. 2. If L$\geq$3, in an exemplary embodiment, the method and system connects port E4 of switch (L−1), such as switch 177, and port E4 of switch L, such as switch 178, as exemplified by 220. In an exemplary embodiment, for all numbers i such that $1 \leq i \leq L-1$, the method and system connects port E3 of switch i and port E2 of switch (i+1), such as connections 230, 231, 232, 233, 234, 235, and 236. In an exemplary embodiment, for all numbers i such that $1 \leq i \leq L-2$, the method and system connects port E4 of switch i and port E1 of switch (i+2), such as connections 240, 241, 242, 243, 244, and 245. In a particular embodiment, the method and system connects ports via cables.

For each switch, at most four cables are connected to external ports of the switch. In an exemplary embodiment, each switch initially has at least four free external ports before the method and system is applied.

Figure 7A:
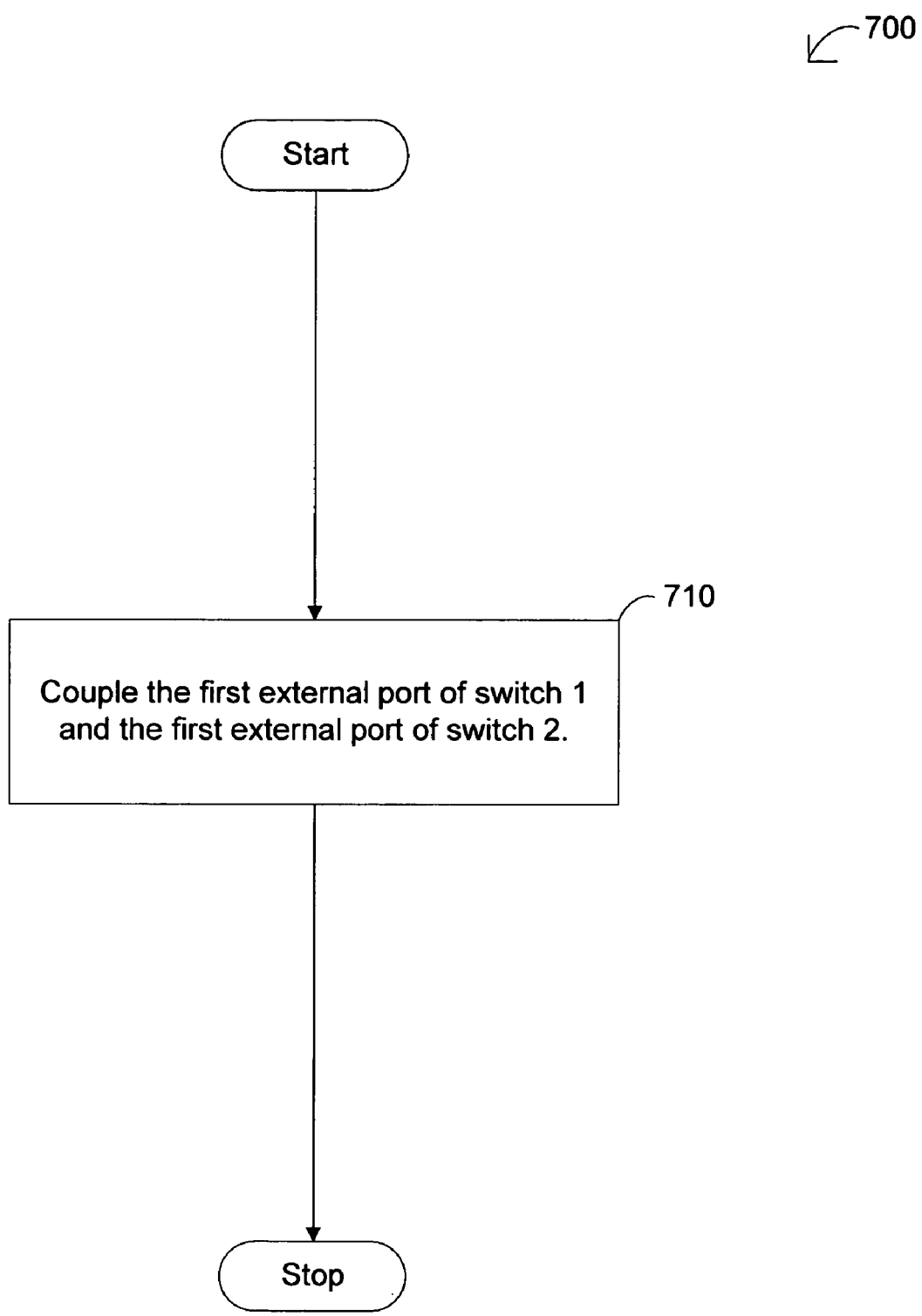
FIG. 7A is a flowchart of the connecting step in accordance with an exemplary embodiment of the present invention.
Figure 7B:
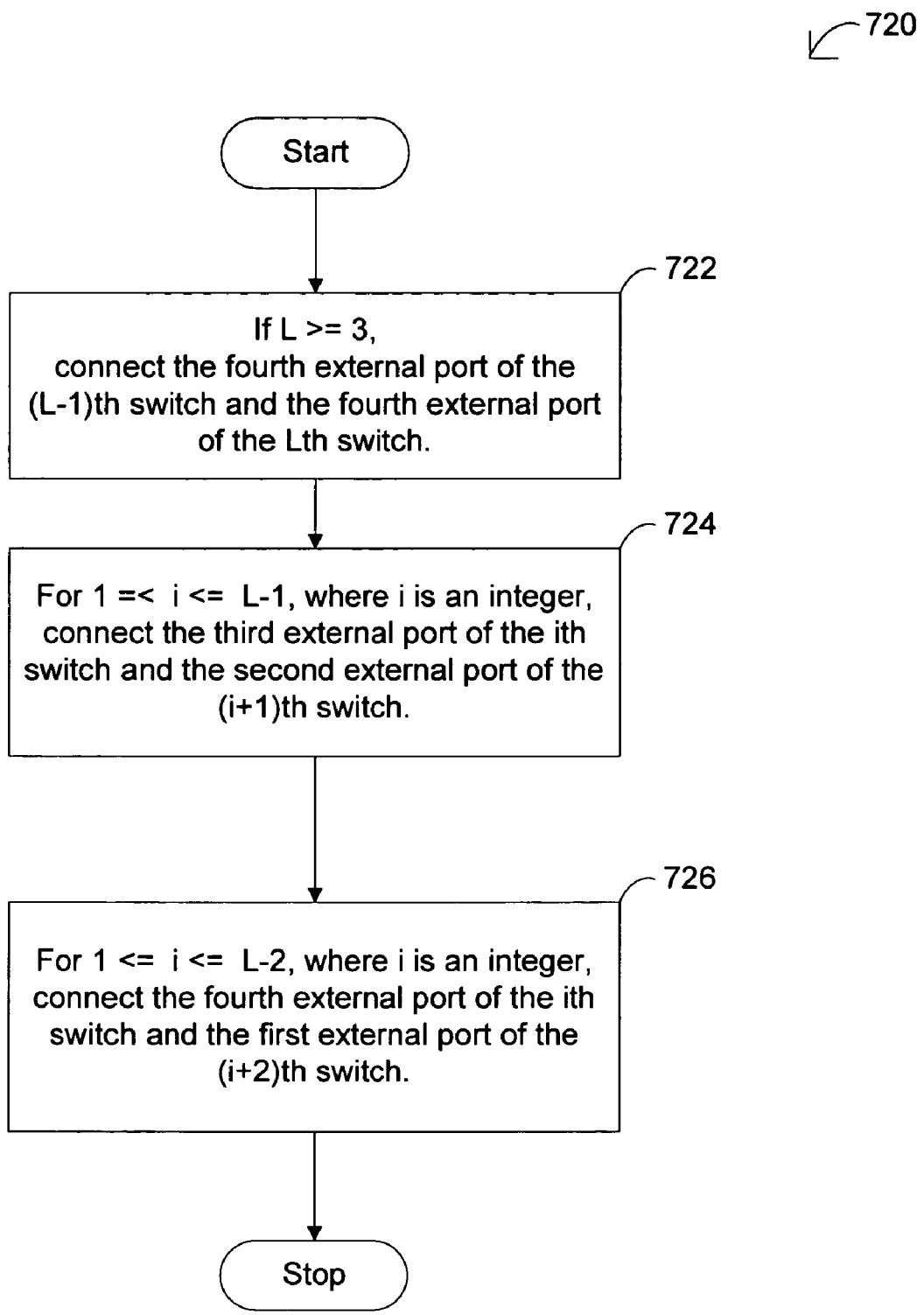
FIG. 7B is a flowchart of the connecting step in accordance with an exemplary embodiment of the present invention.
Figure 7C:
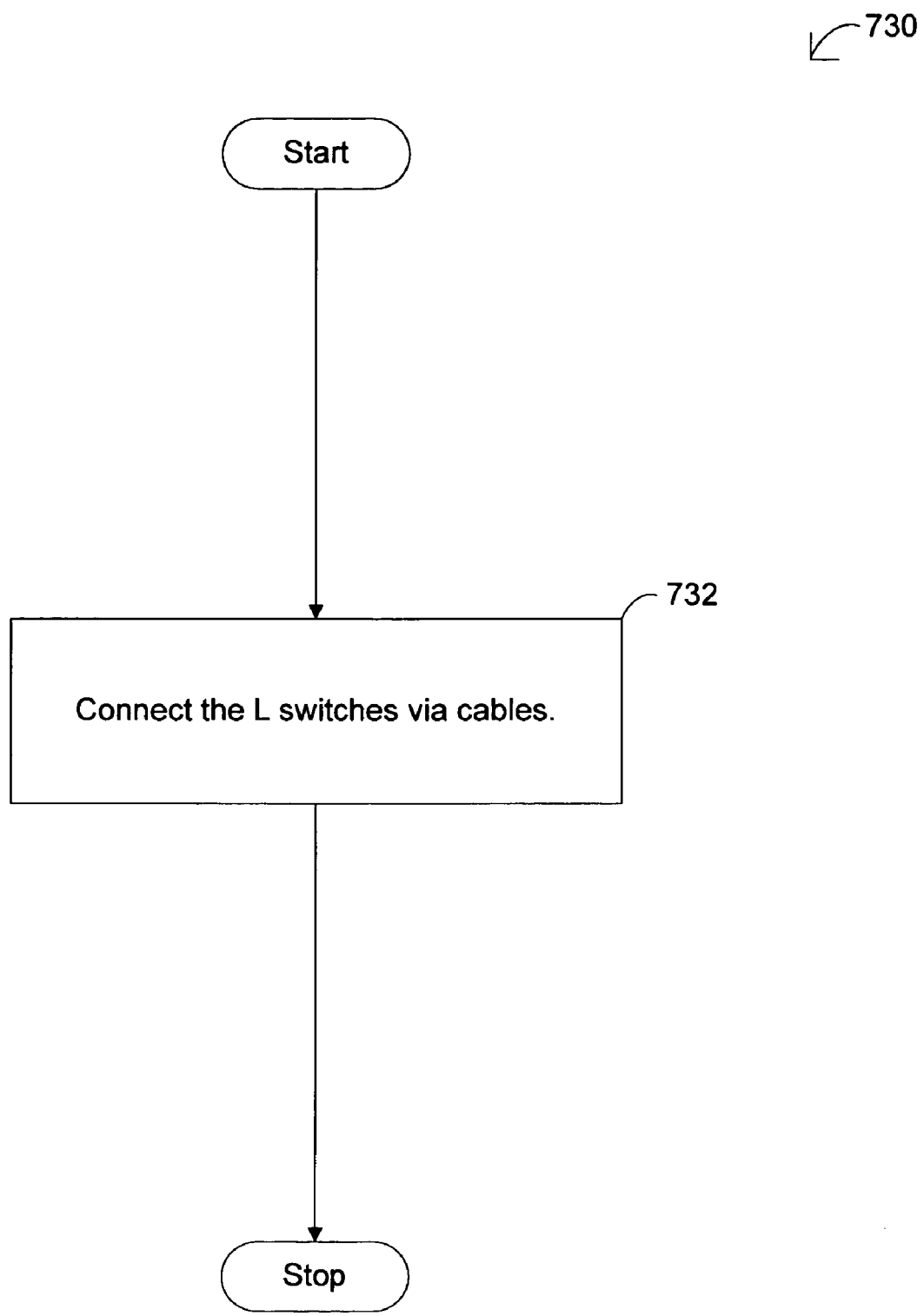
FIG. 7C is a flowchart of the connecting step in accordance with a particular embodiment of the present invention.

Referring to FIG. 7A, in an exemplary embodiment, connecting step 610 includes a step 710 of coupling the first external port of switch 1 and the first external port of switch 2. In a further embodiment, as shown in FIG. 7B, connecting step 610 includes a step 722 of, if L$\geq$3, connecting the fourth external port of the (L−1)th switch and the fourth external port of the Lth switch, a step 724 of, for $1 \leq i \leq L-1$, where i is an integer, connecting the third external port of the ith switch and the second external port of the (i+1)th switch, and a step 726 of, for $1 \leq i \leq L-2$, where i is an integer, connecting the fourth external port of the ith switch and the first external port of the (i+2)th switch. In a particular embodiment, as shown in FIG. 7C, connecting step 610 includes a step 732 of connecting the L switches via cables.

Setting Switches

Figure 3:
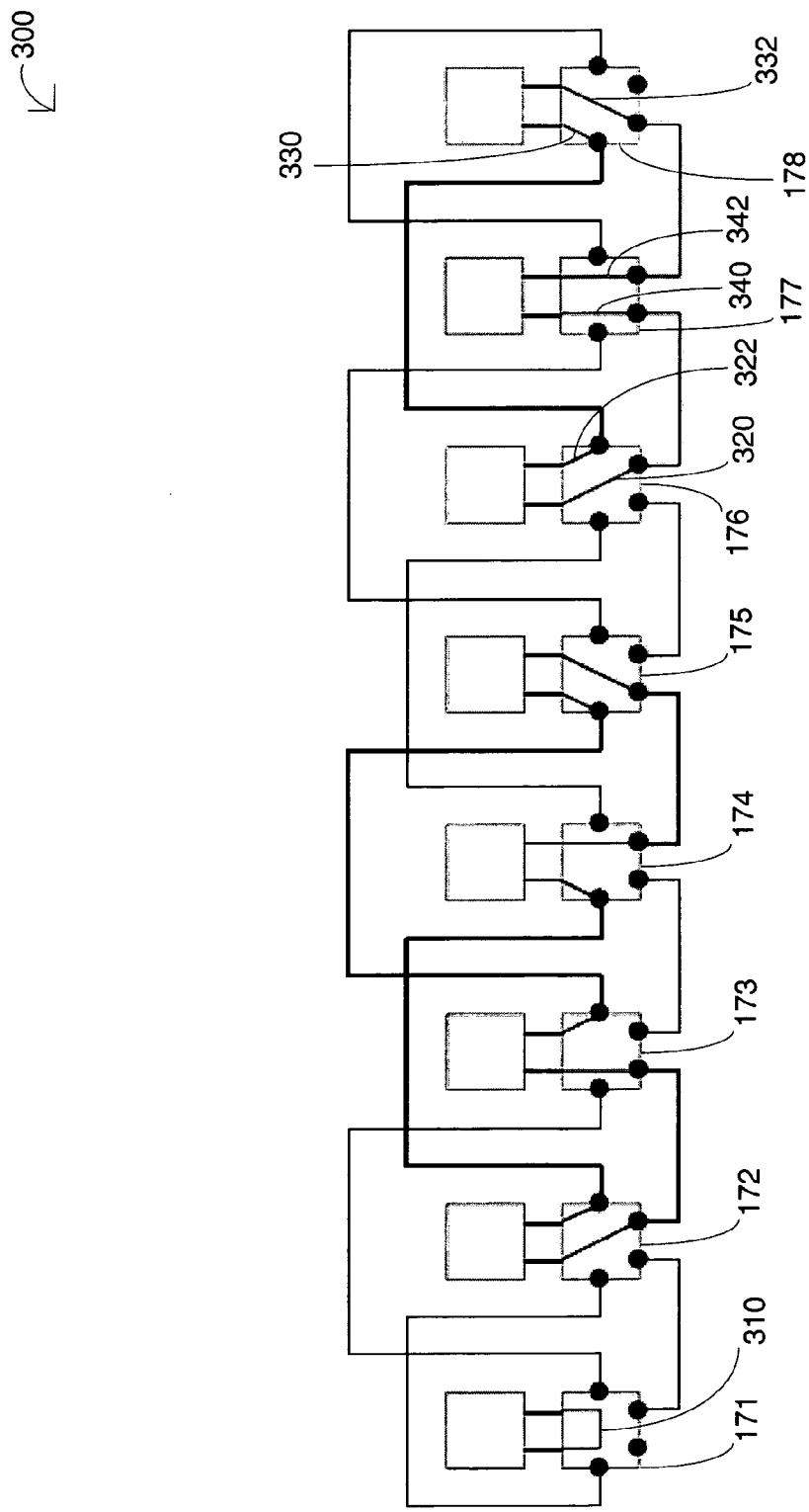
FIG. 3 is a block diagram of a switch setting in accordance with an exemplary embodiment of the present invention.

In an exemplary embodiment, the method and system includes setting the L switches that have been interconnected in a torus architecture, such as extended torus architecture 200, for at least one partition P, in order to interconnect the at least one partition P as a torus. For an arbitrary multiplicity of non-overlapping partitions in a line of switches that are interconnected according to the present invention, the switches are set so that the PUs belonging to each individual partition are interconnected as a torus. For example, FIG. 3 shows how 171, 172, 173, 174, 175, 176, 177, and 178 would be set for the partitions {171}, {172, 173,174,175}, and {176,177,178}, so that each of these three partitions is interconnected as a torus, resulting in switch setting 300. Bold lines are used to indicate cables and switch connections that are used by one of the partitions.

Figure 4:
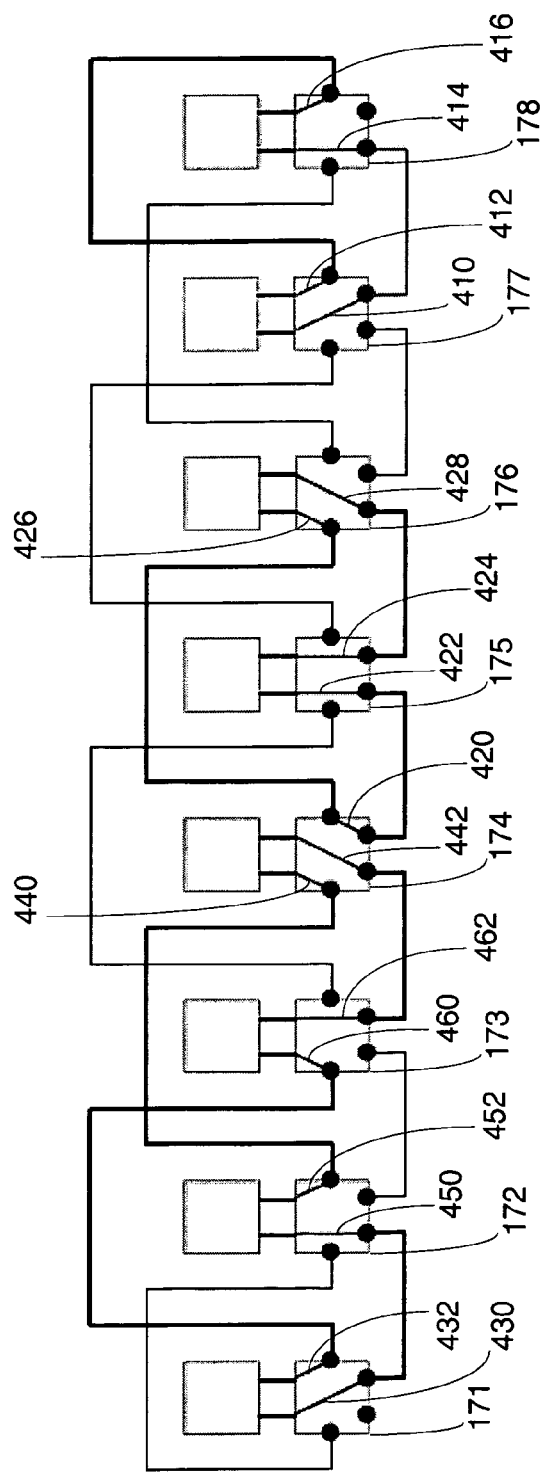
FIG. 4 is a block diagram of a switch setting in accordance with an exemplary embodiment of the present invention.

FIG. 4 shows an example for the partitions {171,172,173, 174}, {175,176}, and {177,178} resulting in switch setting 400 such that a switch, such as switch 174, can be used to form the interconnections for two different partitions, namely partitions {171,172,173,174} and {175,176}.

Figure 5:
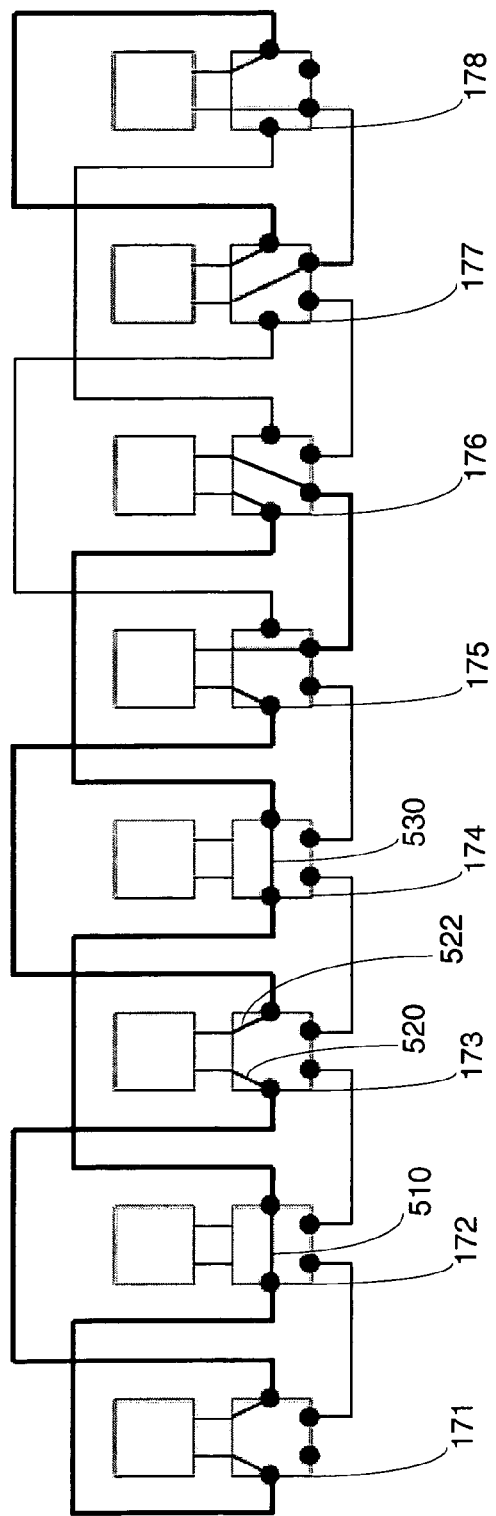
FIG. 5 is a block diagram of a switch setting in accordance with an exemplary embodiment of the present invention.

FIG. 5 shows an example for the partitions {171,173,175, 176} and {177,178} resulting in switch setting 500. Switch setting 500 demonstrates in order to form a torus interconnection for a partition P, such a {171,173,175,176}, where the span of P is larger than P itself, such as the span of P being {171,172,173,174,175,176}, the method and system (a) forms a torus interconnection for the span of P and (b) then resets switch c, for all c that are in the span of P but not in P itself, so that the modified switch setting bypasses PU c.

In an exemplary embodiment, the method and system computes the span of P by (1) finding the minimum coordinate in P, called MIN, (2) finding the maximum coordinate in P, called MAX, and (3) setting S (the span of P) to be equal to the set of coordinates i such that MIN$\leq$i$\leq$MAX. In an exemplary embodiment, if S contains exactly one coordinate, the method and system, with i being the coordinate that belongs to the span, adds a connection (I1,I2) to the setting of switch i, such as connection 310 in FIG. 3.

Figure 8A:
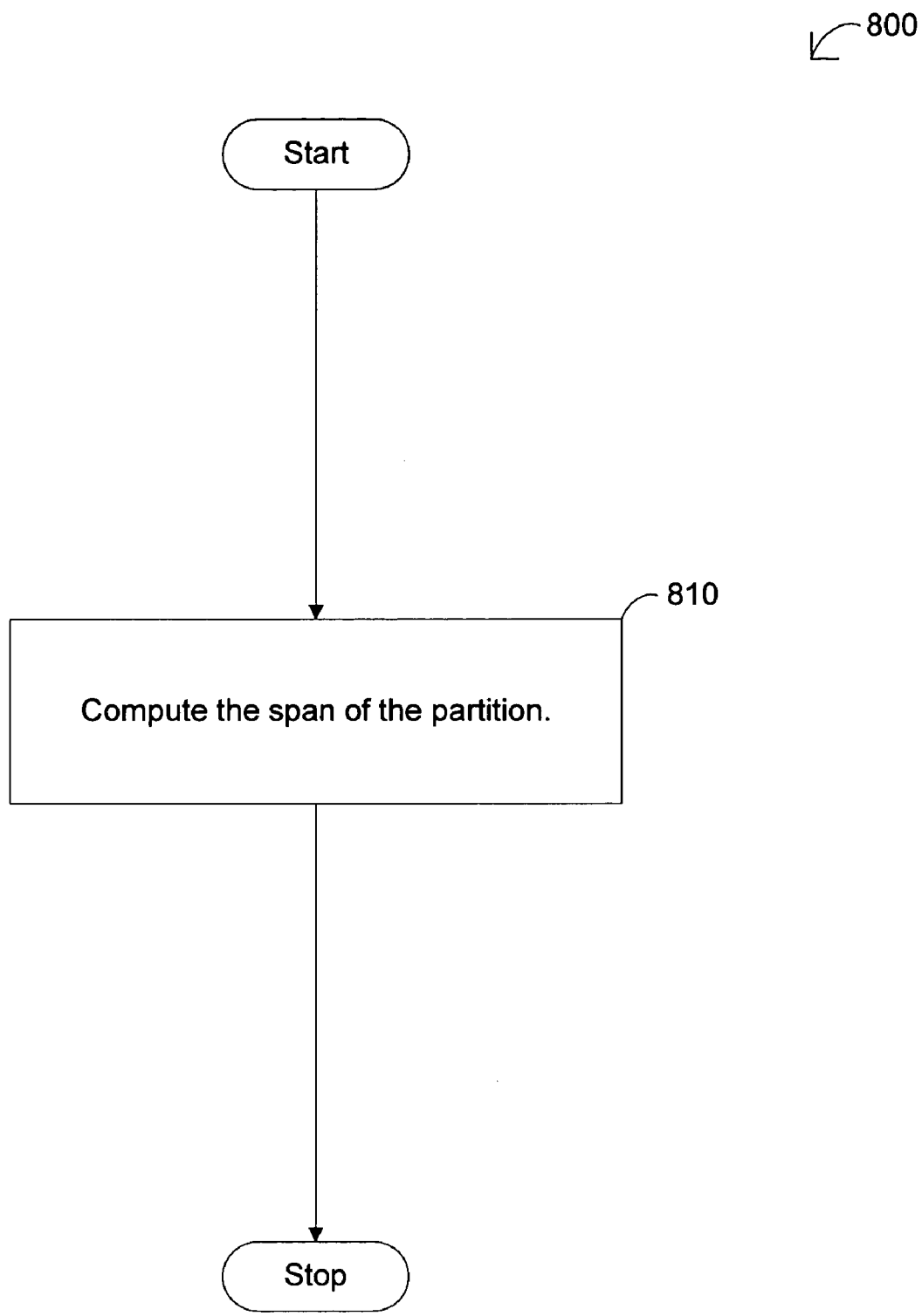
FIG. 8A is a flowchart of the setting step in accordance with an exemplary embodiment of the present invention.
Figure 8B:
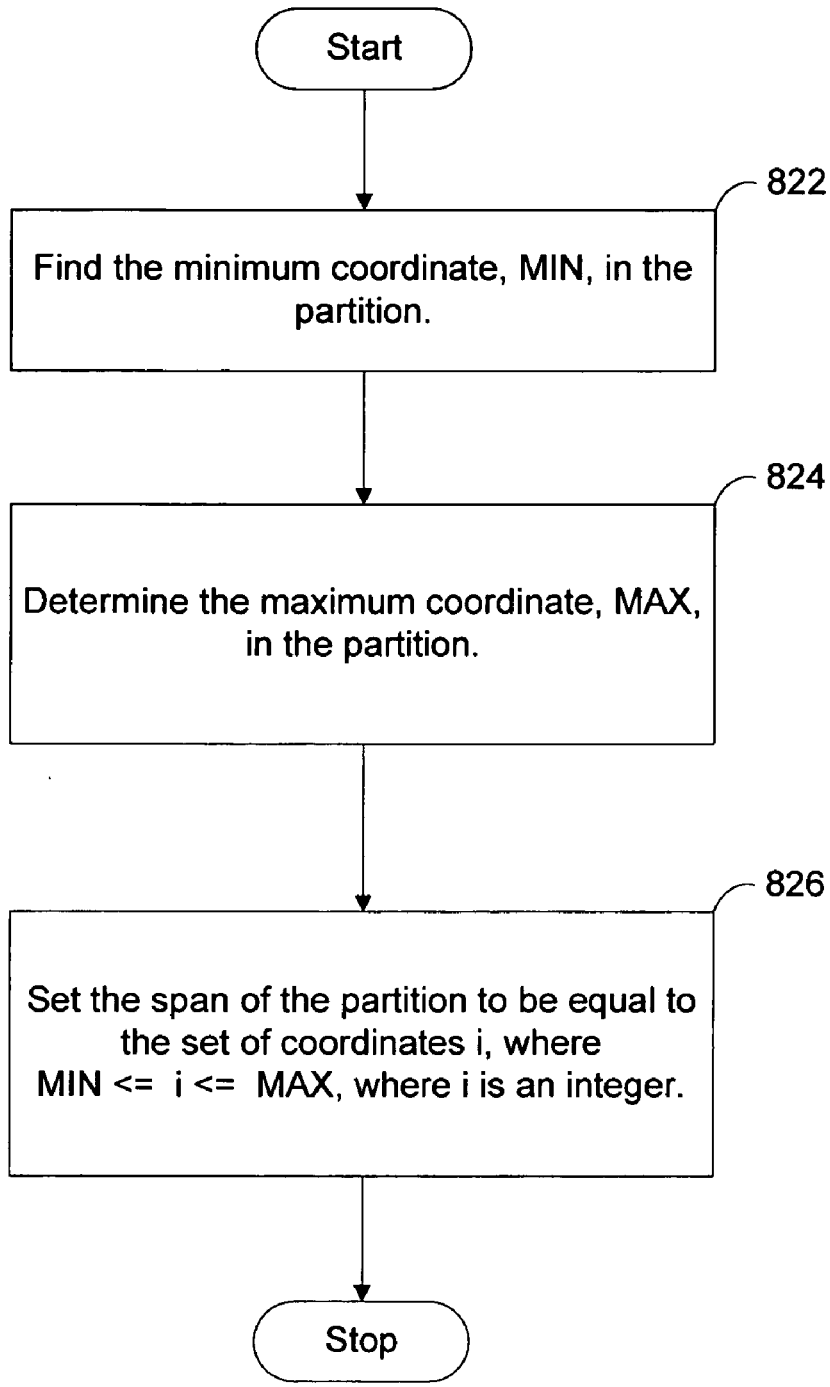
FIG. 8B is a flowchart of the computing step in accordance with an exemplary embodiment of the present invention.

Referring to FIG. 8A, in an exemplary embodiment, setting step 612 includes a step 810 of computing the span of the partition. Referring to FIG. 8B, in an exemplary embodiment, computing step 810 includes a step 822 of finding the minimum coordinate, MIN, in the partition, a step 824 of determining the maximum coordinate, MAX, in the partition, and a step 826 of setting the span of the partition to be equal to the set of coordinates i, where MIN$\leq$i$\leq$MAX, where i is an integer.

S Containing Exactly One Coordinate

Figure 9:
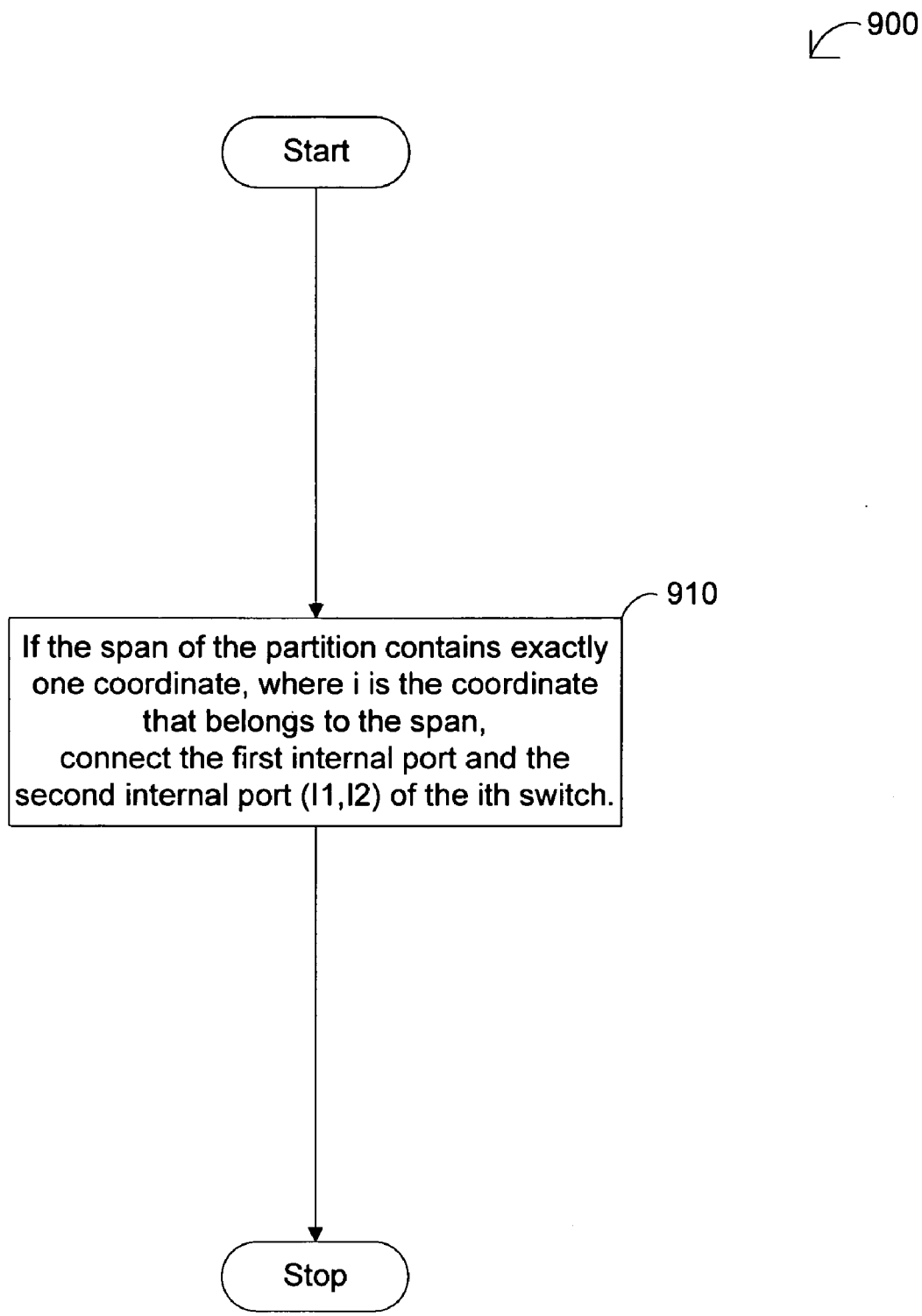
FIG. 9 is a flowchart of the computing step in accordance with a further embodiment of the present invention.

In a further embodiment, as shown in FIG. 9, computing step 810 includes a step 910 of, if the span of the partition contains exactly one coordinate, where i is the coordinate that belongs to the span, connecting the first internal port and the second internal port (I1,I2) of the ith switch.

S Containing Exactly Two Coordinates

In an exemplary embodiment, if S contains exactly two coordinates, with i and i+1 being the two coordinates that belong to the span S, (1) if i=1, the method and system (a) adds connections (E3,I2) and (E1,I1) to the setting of switch 1 and (b) adds connections (E2,I2) and (E1,I1) to the setting of switch 2, (2) if i=L−1, the method and system (a) adds connections (E3,I1) and (E4,I2) to the setting of switch (L−1), such as connection 410 and 412 for switch 177, respectively, in FIG. 4, and (b) adds connections (E2,I1) and (E4,I2) to the setting of switch L, such as connections 414 and 416 for switch 178, respectively, in FIG. 4, and (3) otherwise, where $2 \leq i \leq L-2$, the method and system (a) adds connection (E3,E4) to the setting of switch (i−1), such as connection 420 for switch 174 in FIG. 4, (b) adds connections (E2,I1) and (E3,I2) to the setting of switch i, such as connections 422 and 424 for switch 175 in FIG. 4, and (c) adds connections (E1,I1) and (E2,I2) to the setting of switch (i+1), such as connections 426 and 428 for switch 176 in FIG. 4.

Figure 10A:
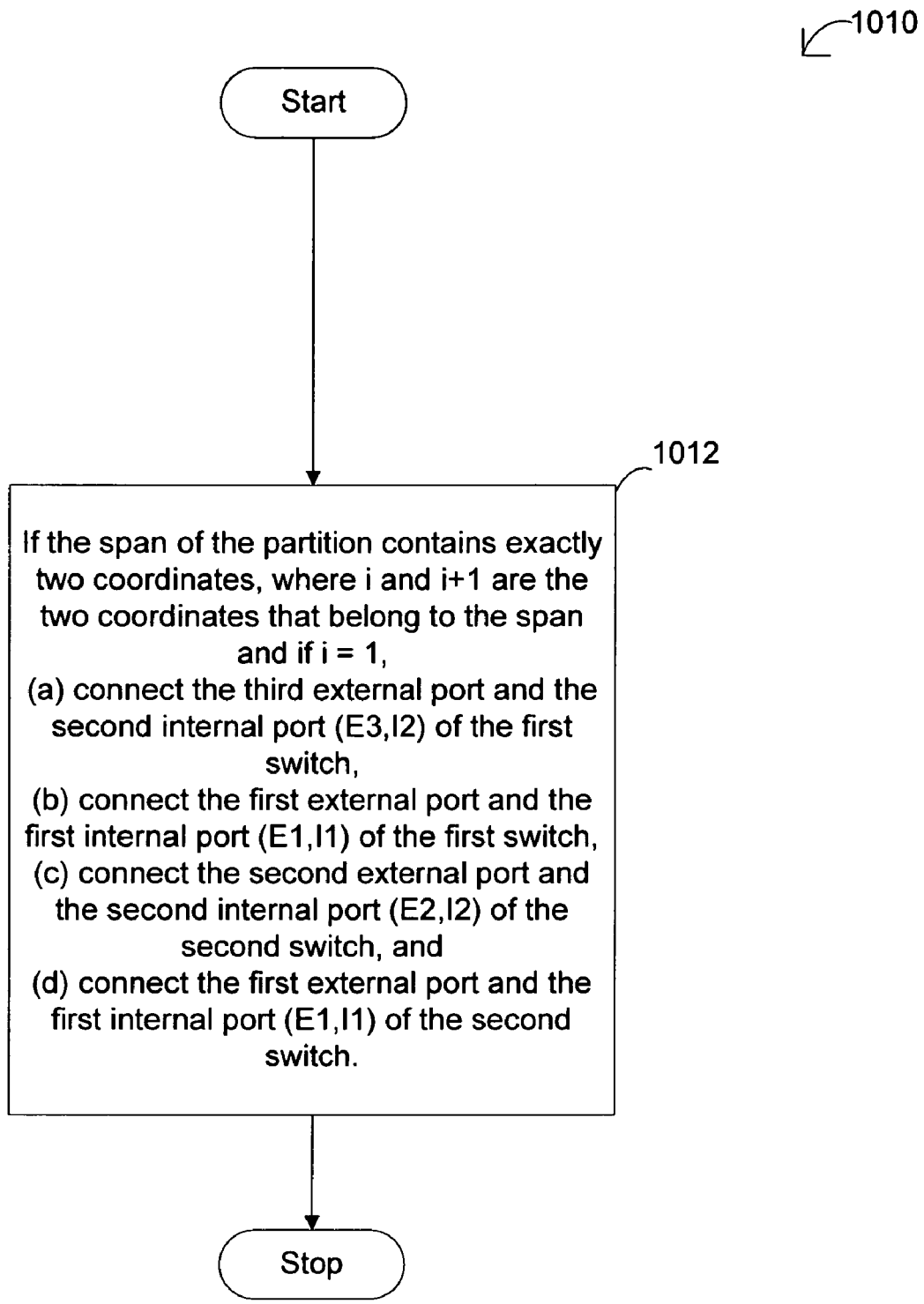
FIG. 10A is a flowchart of the computing step in accordance with a further embodiment of the present invention.

In a further embodiment, as shown in FIG. 10A, computing step 810 includes a step 1012 of, if the span of the partition contains exactly two coordinates, where i and i+1 are the two coordinates that belong to the span and if i=1, (a) connecting the third external port and the second internal port (E3,I2) of the first switch, (b) connecting the first external port and the first internal port (E1,I1) of the first switch, (c) connecting the second external port and the second internal port (E2,I2) of the second switch, and (d) connecting the first external port and the first internal port (E1,I1) of the second switch.

Figure 10B:
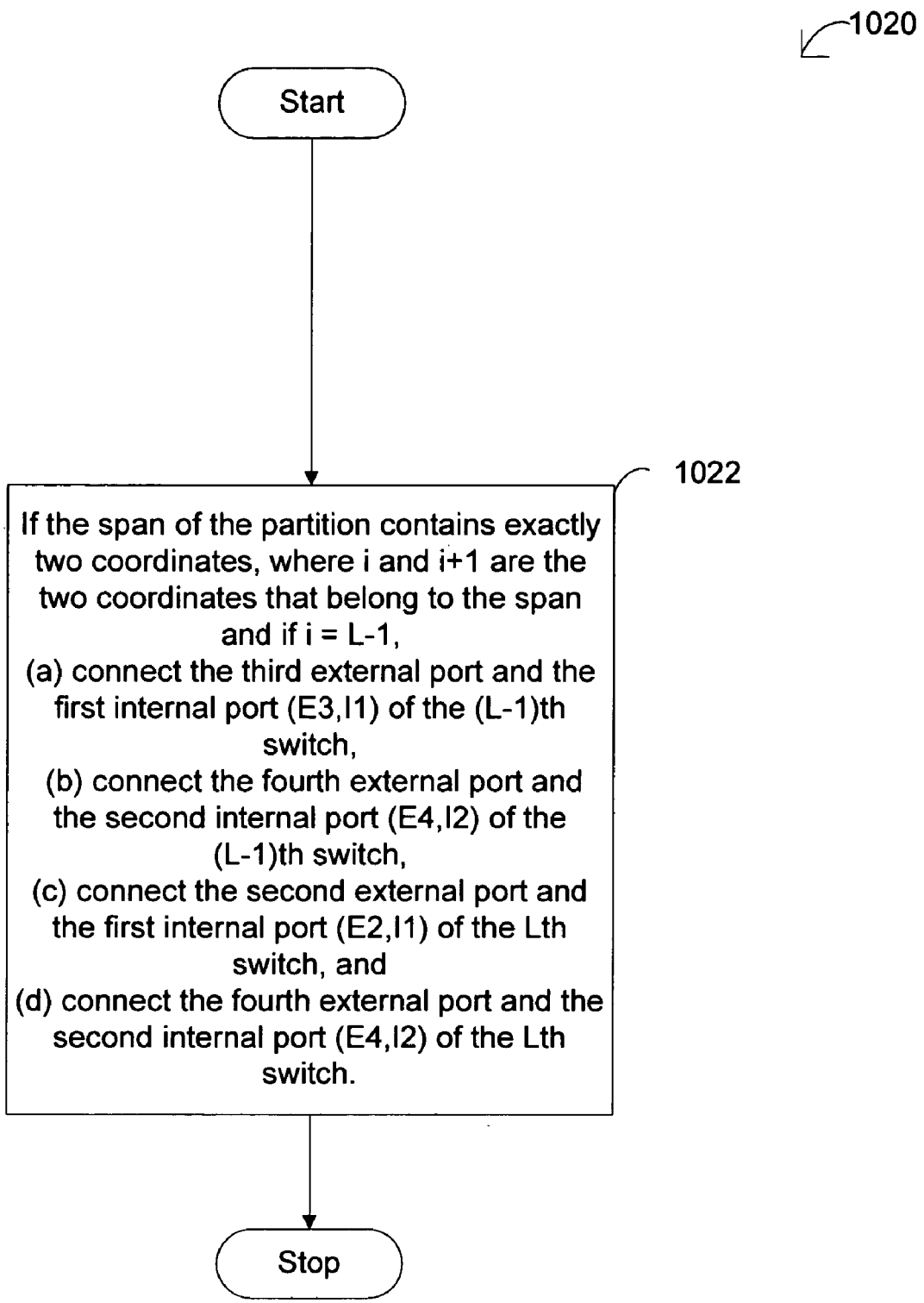
FIG. 10B is a flowchart of the computing step in accordance with a further embodiment of the present invention.

In a further embodiment, as shown in FIG. 10B, computing step 810 includes a step 1022 of, if the span of the partition contains exactly two coordinates, where i and i+1 are the two coordinates that belong to the span and if i=L−1, (a) connecting the third external port and the first internal port (E3,I1) of the (L−1)th switch, (b) connecting the fourth external port and the second internal port (E4,I2) of the (L−1)th switch, (c) connecting the second external port and the first internal port (E2,I1) of the Lth switch, and (d) connecting the fourth external port and the second internal port (E4,I2) of the Lth switch.

Figure 10C:
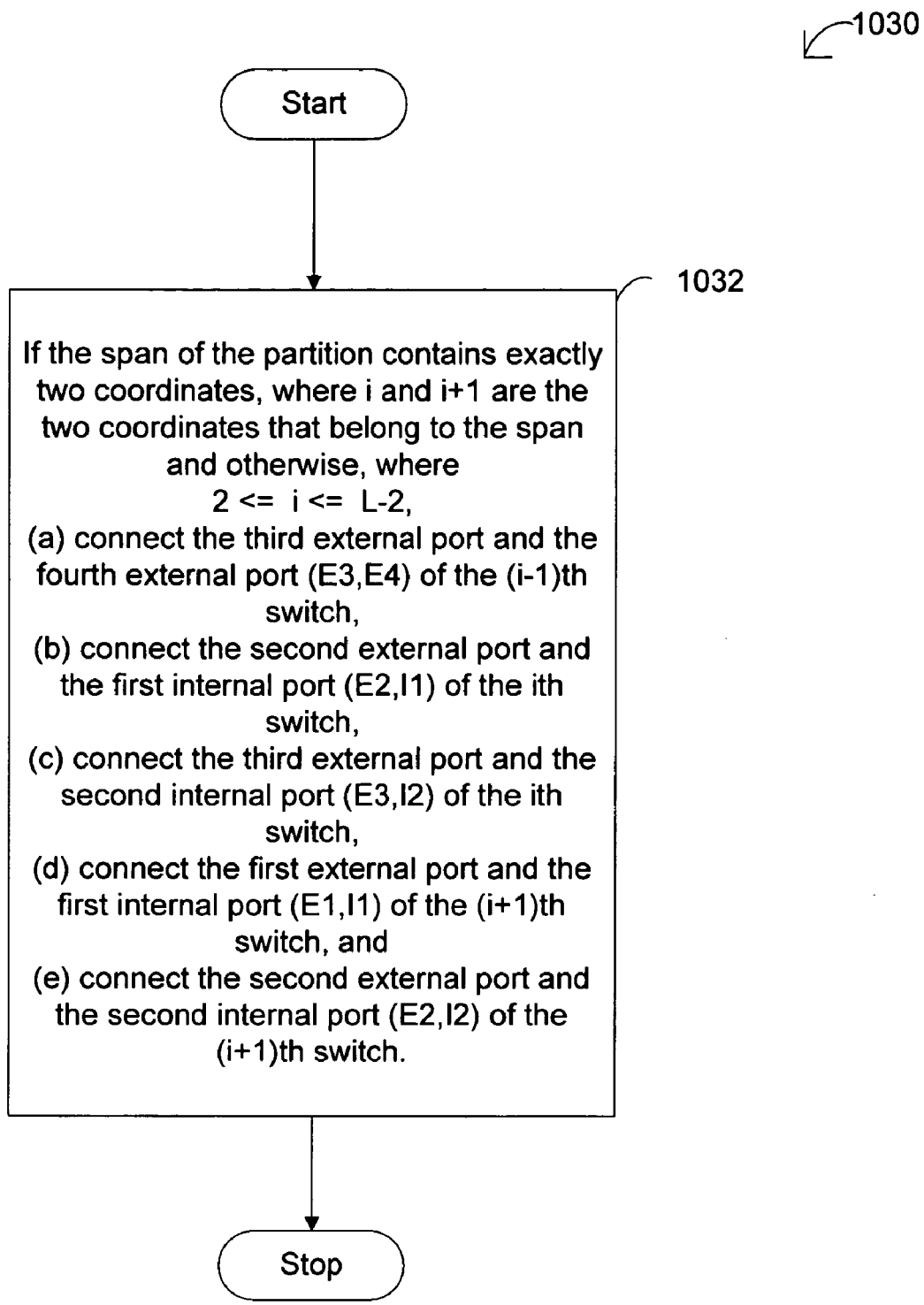
FIG. 10C is a flowchart of the computing step in accordance with a further embodiment of the present invention.

In a further embodiment, as shown in FIG. 10C, computing step 810 includes a step 1032 of, if the span of the partition contains exactly two coordinates, where i and i+1 are the two coordinates that belong to the span and otherwise, where $2 \leq i \leq L-2$, (a) connecting the third external port and the fourth external port (E3,E4) of the (i−1)th switch, (b) connecting the second external port and the first internal port (E2,I1) of the ith switch, (c) connecting the third external port and the second internal port (E3,I2) of the ith switch, (d) connecting the first external port and the first internal port (E1,I1) of the (i+1)th switch, and (e) connecting the second external port and the second internal port (E2,I2) of the (i+1)th switch.

S Containing Exactly Three Coordinates

In an exemplary embodiment, if S contains exactly three coordinates, with i, i+1, and i+2 being the three coordinates that belong to the span, the method and system (1) adds connections (E3,I1) and (E4,I2) to the setting of switch i, such as connections 320 and 322 for switch 176 in FIG. 3, (2) adds connections (E1,I1) and (E2,I2) to the setting of switch (i+2), such as connections 330 and 332 for switch 178 in FIG. 3, (3) if (i+1) belongs to the partition P, adds connections (E2,I1) and (E3,I2) to the setting of switch (i+1), such as connection 340 and 342 for switch 177 in FIG. 3, and (4) if (i+1) does not belong to the partition P, adds connection (E2,E3) to the setting of switch (i+1).

Figure 11A:
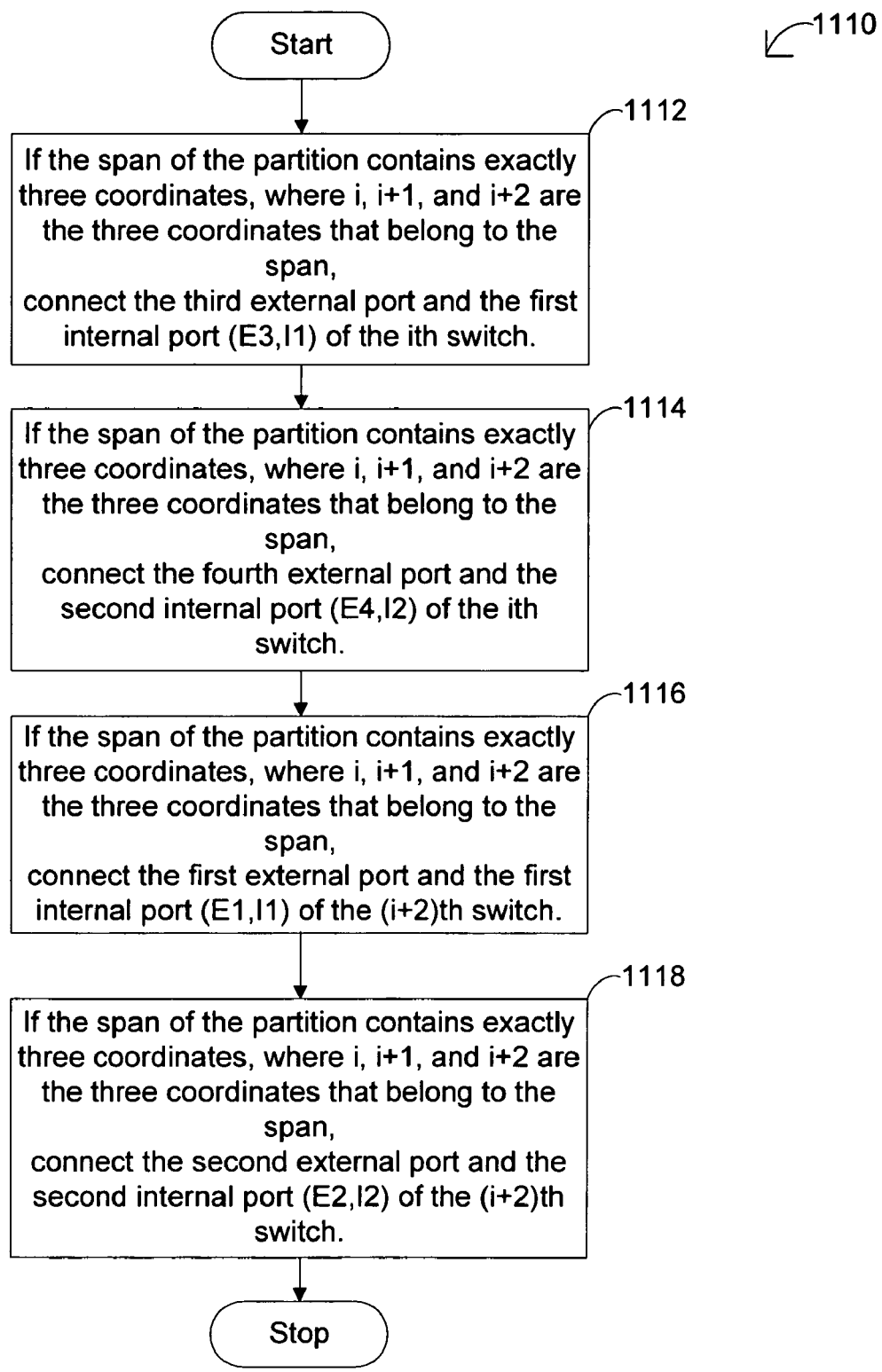
FIG. 11A is a flowchart of the computing step in accordance with a further embodiment of the present invention.

In a further embodiment, as shown in FIG. 11A, computing step 810 includes a step 1112 of, if the span of the partition contains exactly three coordinates, where i, i+1, and i+2 are the three coordinates that belong to the span, connecting the third external port and the first internal port (E3,I1) of the ith switch, a step 1114 of, if the span of the partition contains exactly three coordinates, where i, i+1, and i+2 are the three coordinates that belong to the span, connecting the fourth external port and the second internal port (E4,I2) of the ith switch, a step 1116 of, if the span of the partition contains exactly three coordinates, where i, i+1, and i+2 are the three coordinates that belong to the span, connecting the first external port and the first internal port (E1,I1) of the (i+2)th switch, and a step 1118 of, if the span of the partition contains exactly three coordinates, where i, i+1, and i+2 are the three coordinates that belong to the span, connecting the second external port and the second internal port (E2,I2) of the (i+2)th switch.

Figure 11B:
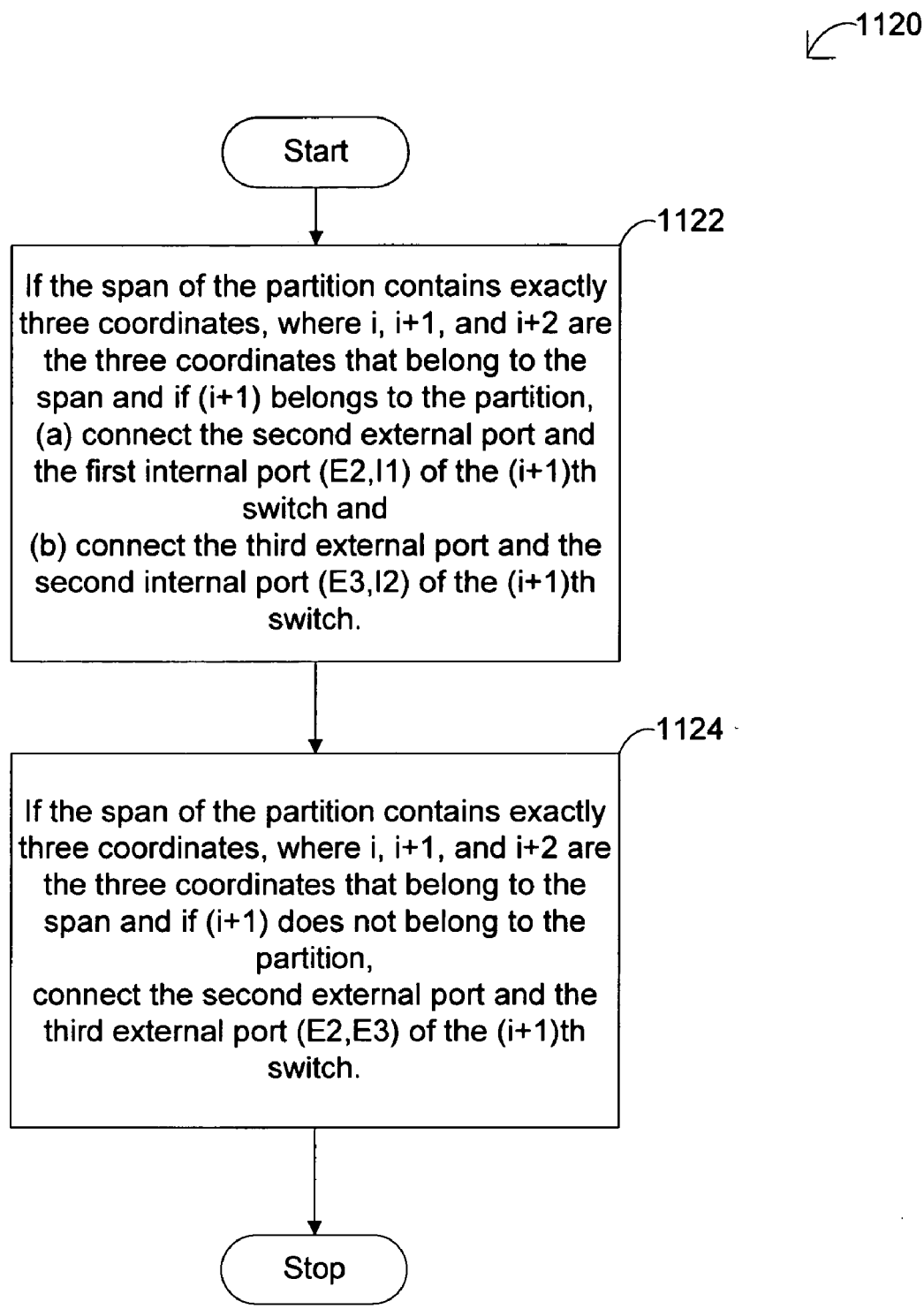
FIG. 11B is a flowchart of the computing step in accordance with a further embodiment of the present invention.

In a further embodiment, as shown in FIG. 11B, computing step 810 includes a step 1122 of, if the span of the partition contains exactly three coordinates, where i, i+1, and i+2 are the three coordinates that belong to the span and if (i+1) belongs to the partition, (a) connecting the second external port and the first internal port (E2,I1) of the (i+1)th switch and (b) connecting the third external port and the second internal port (E3,I2) of the (i+1)th switch and a step 1124 of, if the span of the partition contains exactly three coordinates, where i, i+1, and i+2 are the three coordinates that belong to the span and if (i+1) does not belong to the partition, connecting the second external port and the third external port (E2,E3) of the (i+1)th switch.

S Containing At Least Four Coordinates

In an exemplary embodiment, if S contains at least four coordinates, for each coordinate i such that $MIN \leq i \leq MAX$, (1) if i=MIN, the method and system adds connections (E3,I1) and (E4,I2) to the setting of switch i, such as connections 430 and 432 for switch 171 in FIG. 4, (2) if i=MAX, the method and system adds connections (E1,I1) and (E2,I2) to the setting of switch i, such as connections 440 and 442 for switch 174 in FIG. 4, (3) if i=MIN+1 and i belongs to P, the method and system adds connections (E2,I1) and (E4,I2) to the setting of switch i, such as connections 450 and 452 for switch 172, (4) if i=MIN+1 and i does not belong to P, the method and system adds connection (E2,E4) to the setting of switch i, such as connection 510 for switch 172 in FIG. 5, (5) if i=MAX−1 and i belongs to P, the method and system adds connections (E1,I1) and (E3,I2) to the setting of switch i, such as connections 460 and 462 for switch 173 in FIG. 4, (6) if i=MAX−1 and i does not belong to P, the method and system adds connection (E1,E3) to the setting of switch i, (7) if $MIN+2 \leq i \leq MAX-2$ and i belongs to P, the method and system adds connections (E1,I1) and (E4,I2) to the setting of switch i, such as connections 520 and 522 for switch 173 in FIG. 5, and (8) if $MIN+2 \leq i \leq MAX-2$ and i does not belong to P, the method and system adds connection (E1,E4) to the setting of switch i, such as connection 530 for switch 174 in FIG. 5.

Figure 12A:
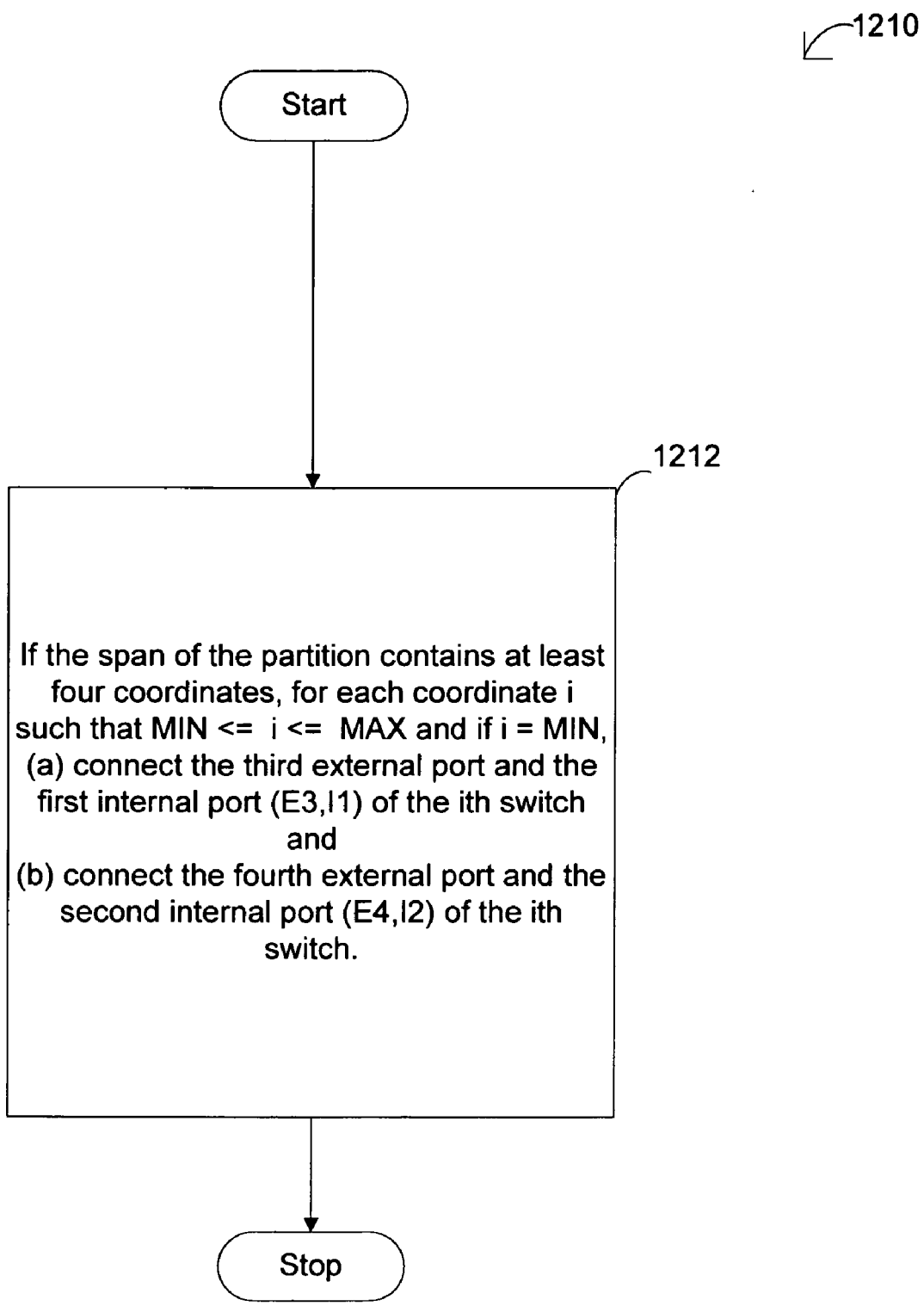
FIG. 12A is a flowchart of the computing step in accordance with a further embodiment of the present invention.

In a further embodiment, as shown in FIG. 12A, computing step 810 includes a step 1212 of, if the span of the partition contains at least four coordinates, for each coordinate i such that $MIN \leq i \leq MAX$ and if i=MIN, (a) connecting the third external port and the first internal port (E3,I1) of the ith switch and (b) connecting the fourth external port and the second internal port (E4,I2) of the ith switch.

Figure 12B:
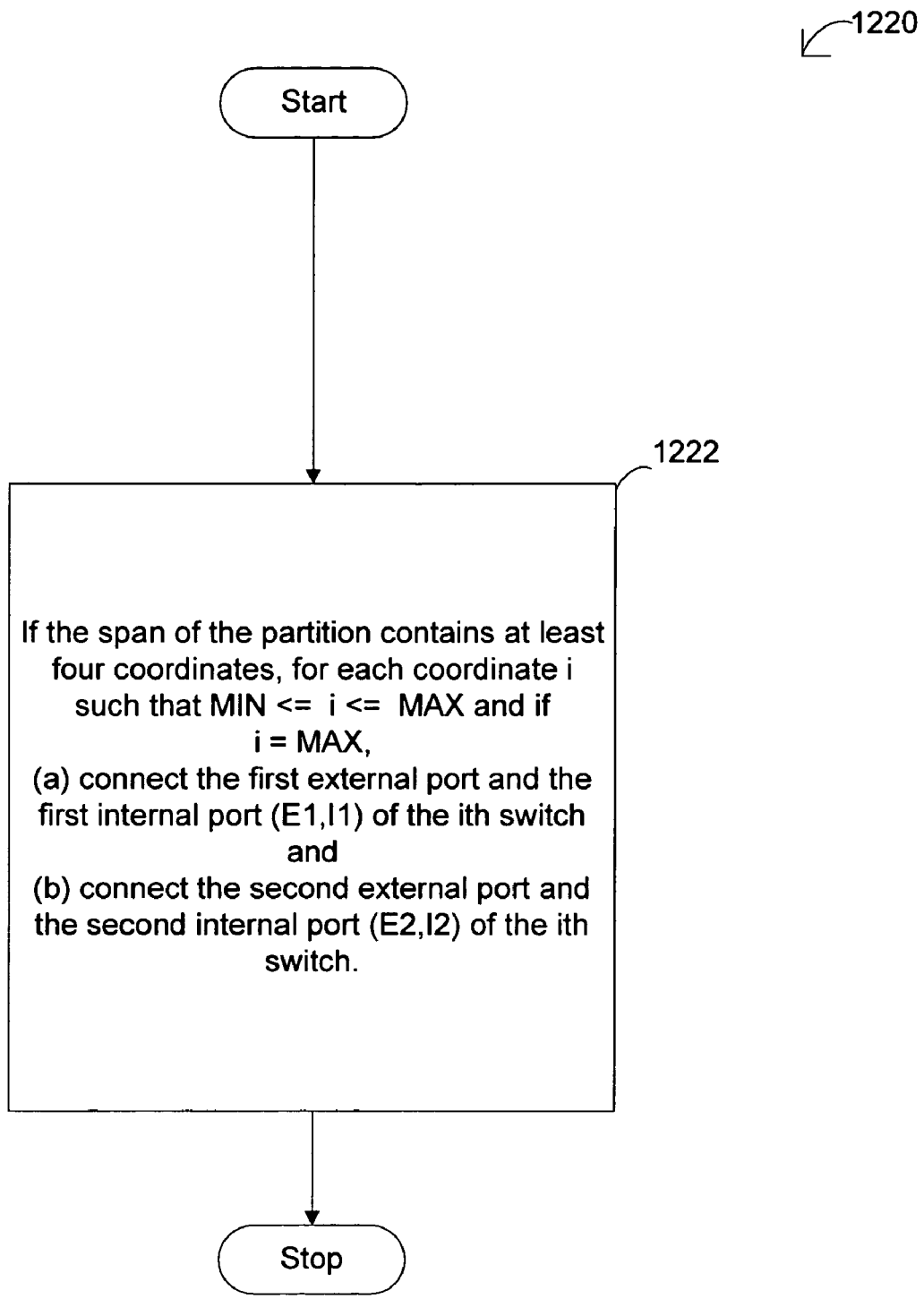
FIG. 12B is a flowchart of the computing step in accordance with a further embodiment of the present invention.

In a further embodiment, as shown in FIG. 12B, computing step 810 includes a step 1222 of, if the span of the partition contains at least four coordinates, for each coordinate i such that $MIN \leq i \leq MAX$ and if i=MAX, (a) connecting the first external port and the first internal port (E1,I1) of the ith switch and (b) connecting the second external port and the second internal port (E2,I2) of the ith switch.

Figure 12C:
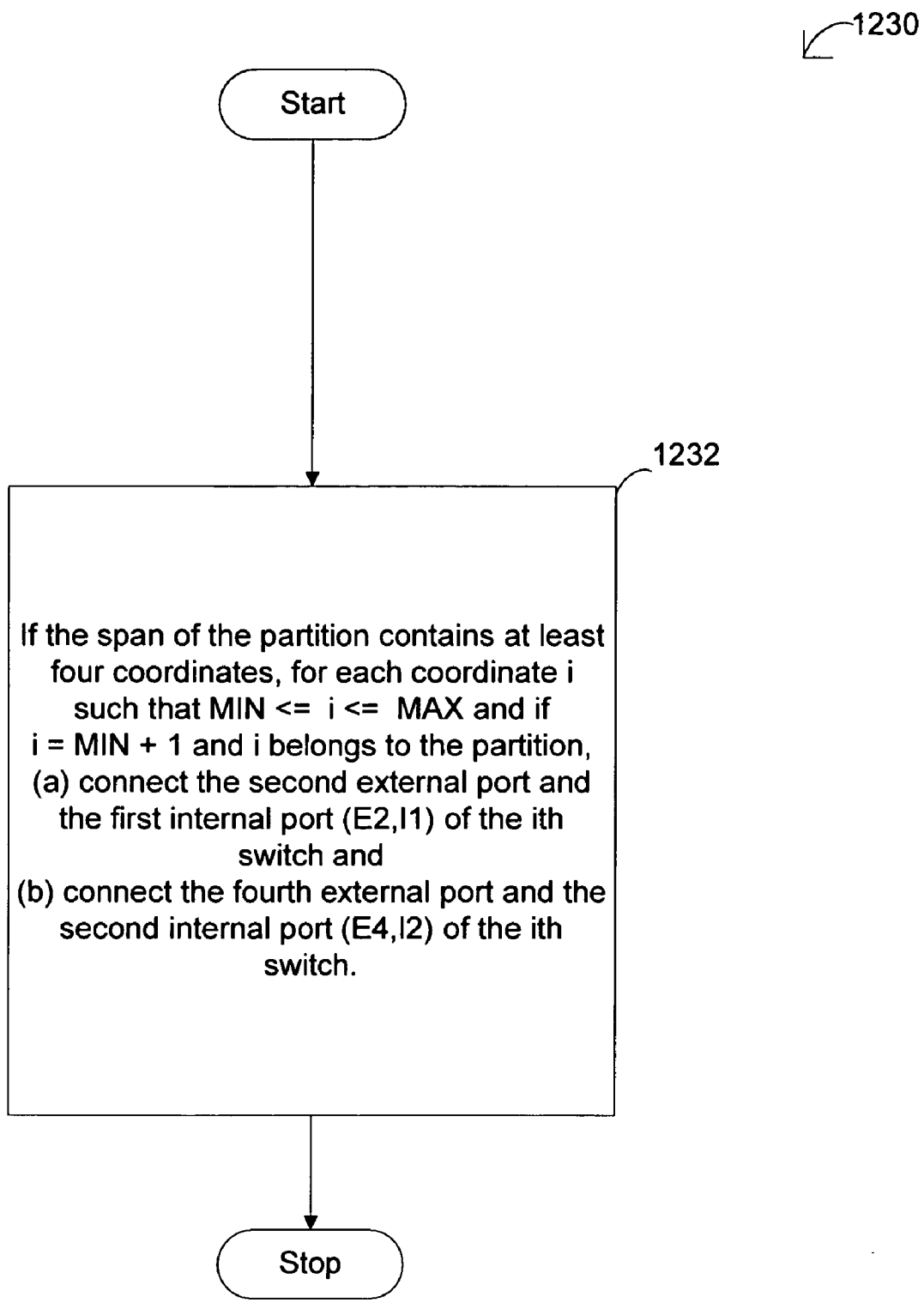
FIG. 12C is a flowchart of the computing step in accordance with a further embodiment of the present invention.

In a further embodiment, as shown in FIG. 12C, computing step 810 includes a step 1232 of, if the span of the partition contains at least four coordinates, for each coordinate i such that $MIN \leq i \leq MAX$ and if i=MIN+1 and i belongs to the partition, (a) connecting the second external port and the first internal port (E2,I1) of the ith switch and (b) connecting the fourth external port and the second internal port (E4,I2) of the ith switch.

Figure 12D:
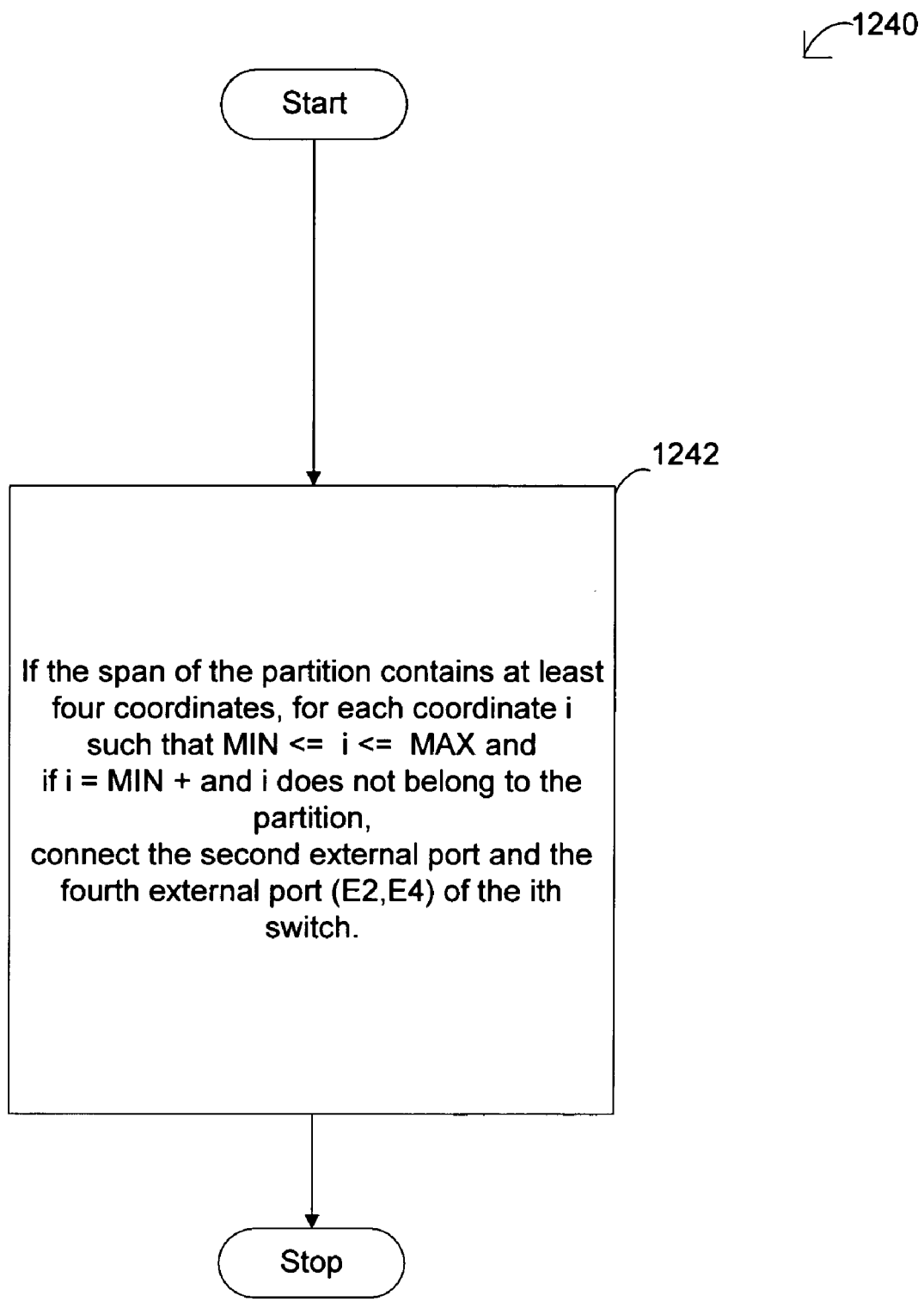
FIG. 12D is a flowchart of the computing step in accordance with a further embodiment of the present invention.

In a further embodiment, as shown in FIG. 12D, computing step 810 includes a step 1242 of, if the span of the partition contains at least four coordinates, for each coordinate i such that $MIN \leq i \leq MAX$ and if i=MIN+1 and i does not belong to the partition, connecting the second external port and the fourth external port (E2,E4) of the ith switch.

Figure 12E:
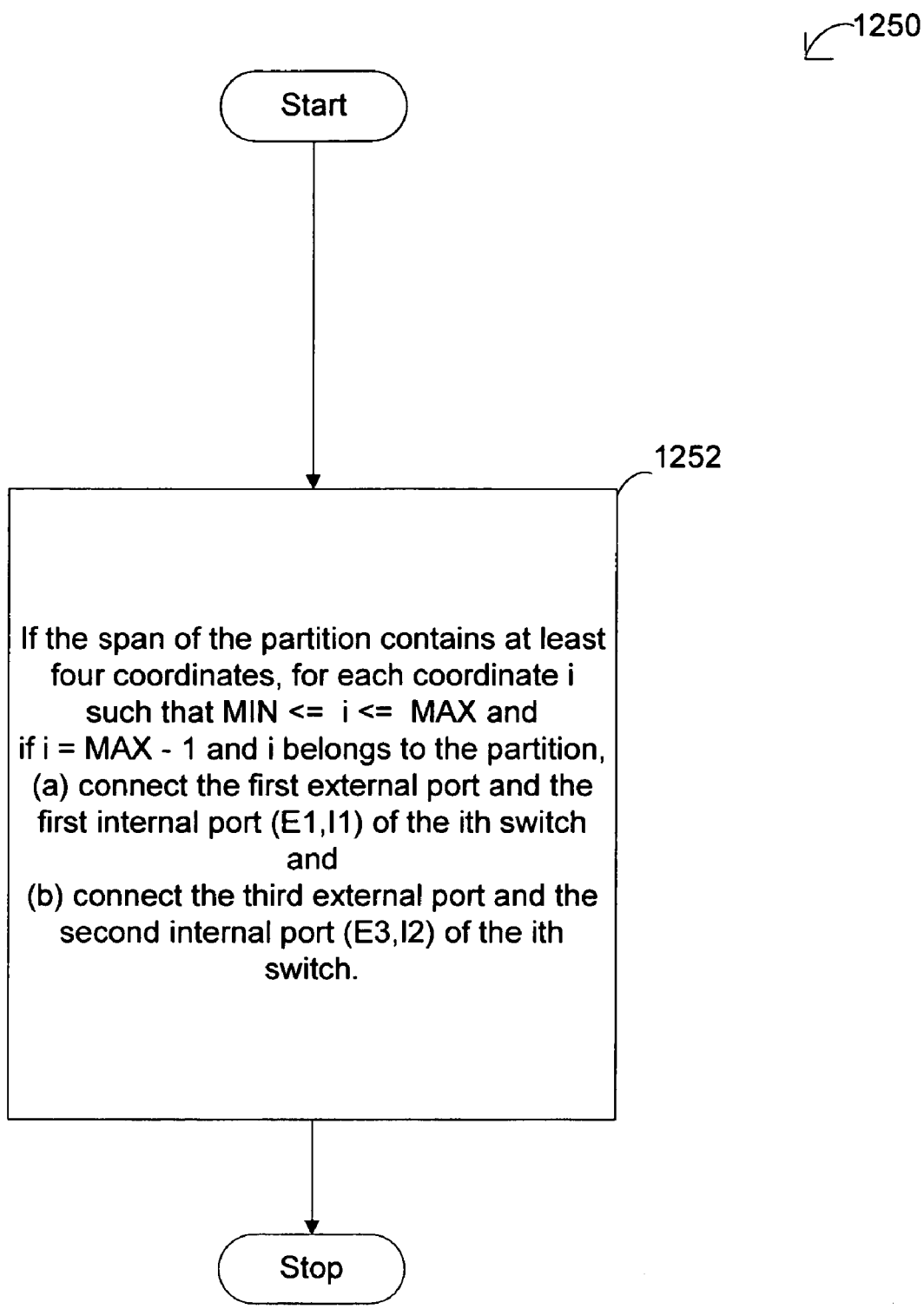
FIG. 12E is a flowchart of the computing step in accordance with a further embodiment of the present invention.

In a further embodiment, as shown in FIG. 12E, computing step 810 includes a step 1252 of, if the span of the partition contains at least four coordinates, for each coordinate i such that $MIN \leq i \leq MAX$ and if i=MAX−1 and i belongs to the partition, (a) connecting the first external port and the first internal port (E1,I1) of the ith switch and (b) connecting the third external port and the second internal port (E3,I2) of the ith switch.

Figure 12F:
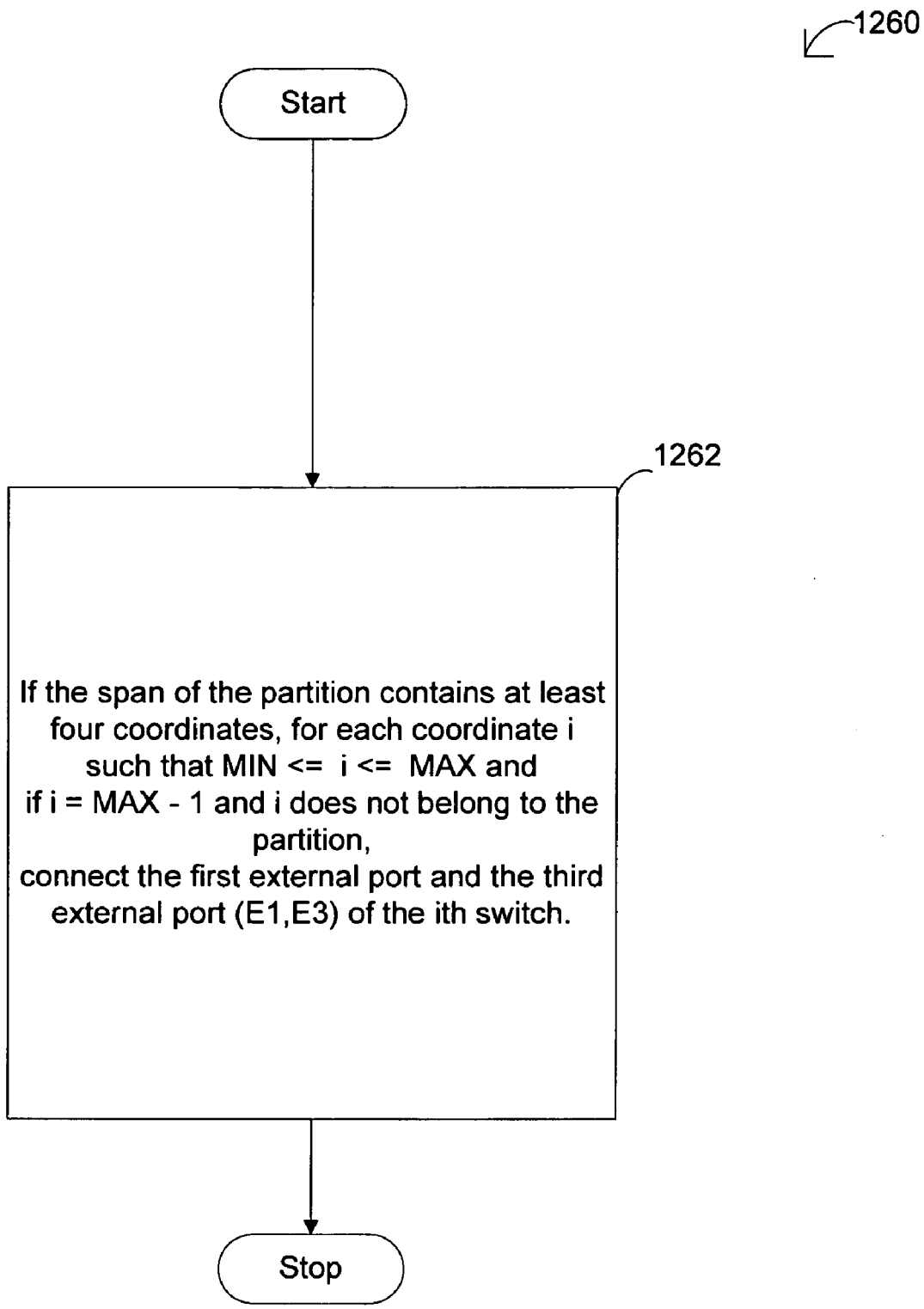
FIG. 12F is a flowchart of the computing step in accordance with a further embodiment of the present invention.

In a further embodiment, as shown in FIG. 12F, computing step 810 includes a step 1262 of, if the span of the partition contains at least four coordinates, for each coordinate i such that $MIN \leq i \leq MAX$ and if i=MAX−1 and i does not belong to the partition, connecting the first external port and the third external port (E1,E3) of the ith switch.

Figure 12G:
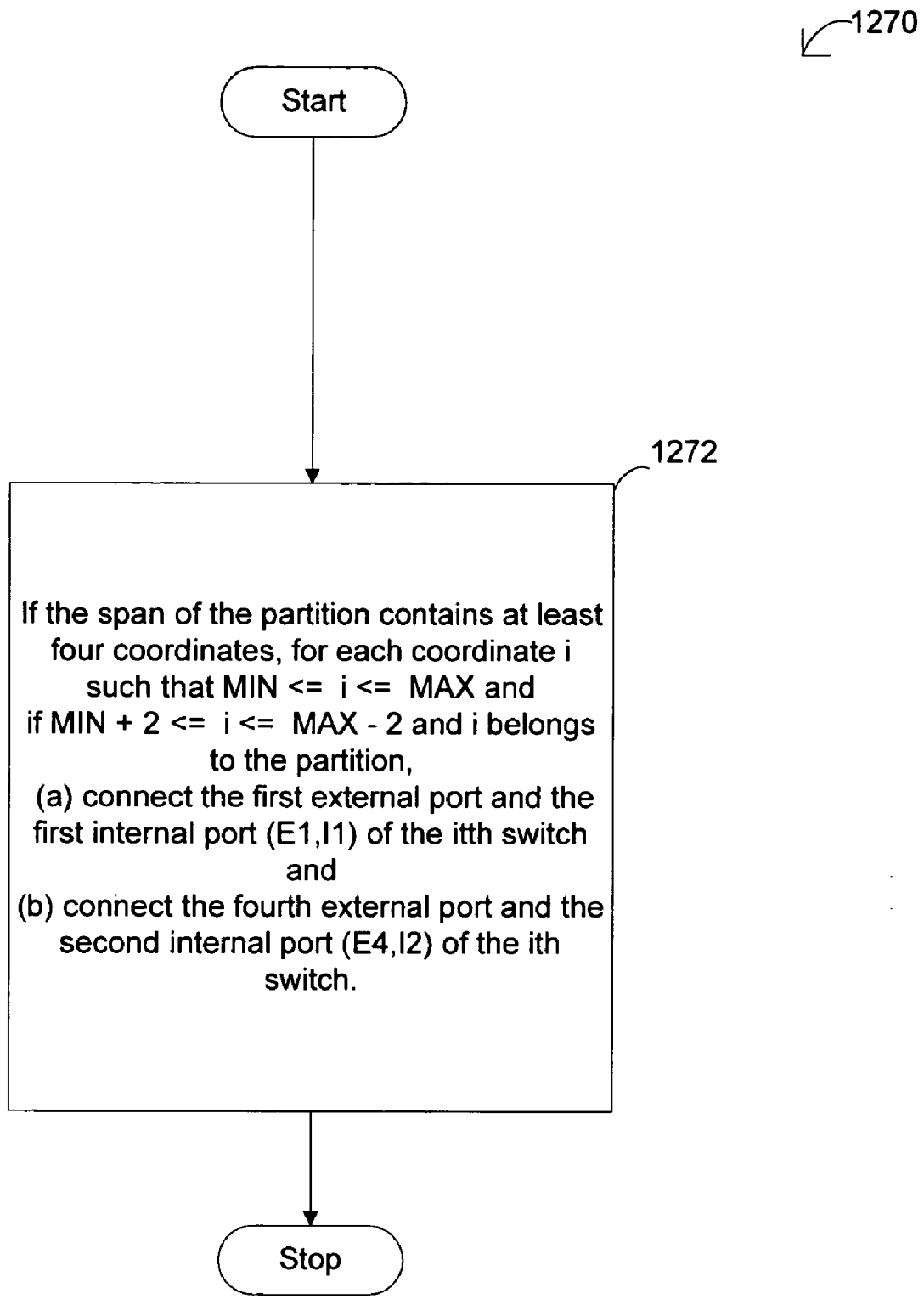
FIG. 12G is a flowchart of the computing step in accordance with a further embodiment of the present invention.

In a further embodiment, as shown in FIG. 12G, computing step 810 includes a step 1272 of, if the span of the partition contains at least four coordinates, for each coordinate i such that MIN≦i≦MAX and if MIN+2≦i≦MAX−2 and i belongs to the partition, (a) connecting the first external port and the first internal port (E1,I1) of the ith switch and (b) connecting the fourth external port and the second internal port (E4,I2) of the ith switch.

Figure 12H:
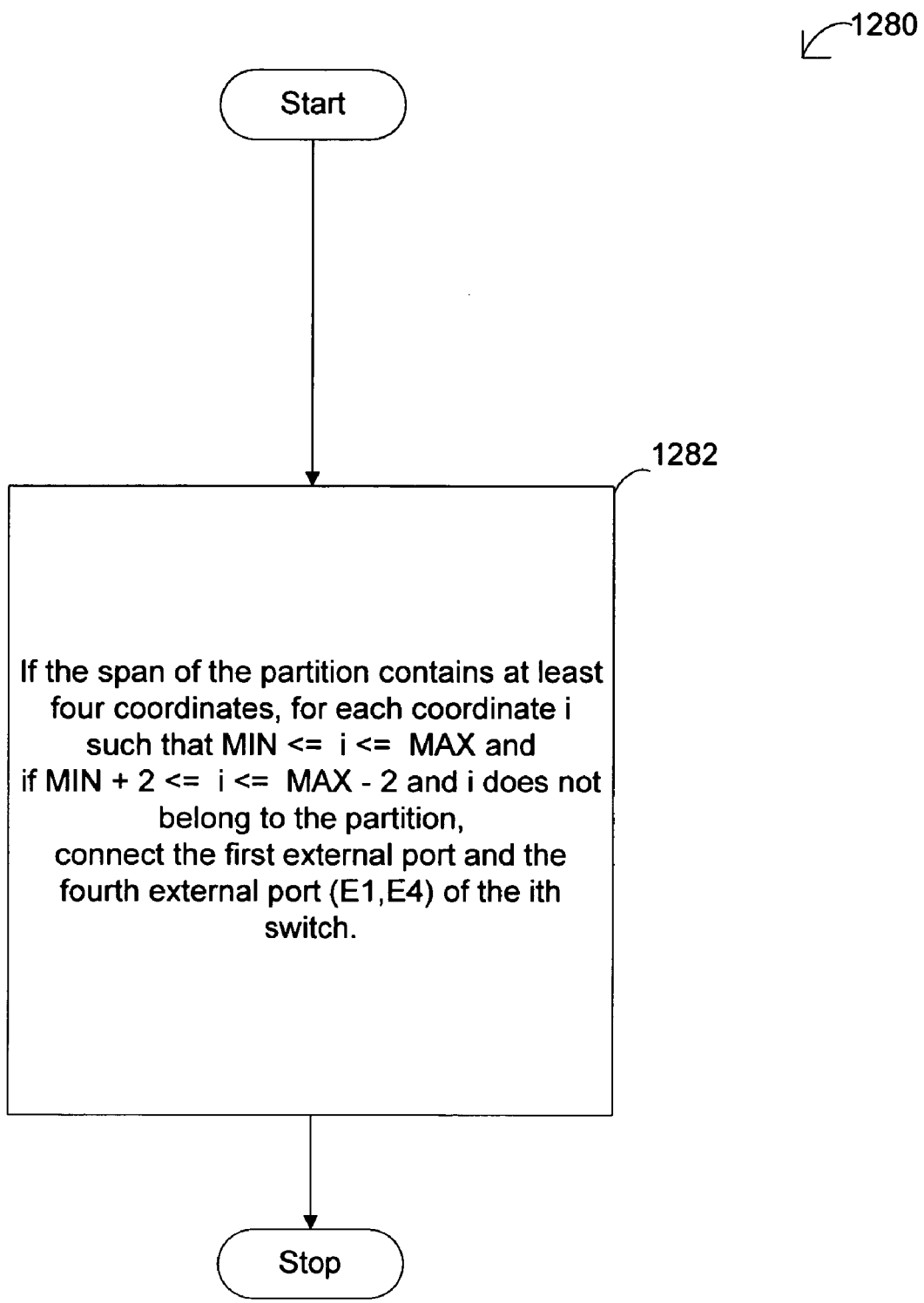
FIG. 12H is a flowchart of the computing step in accordance with a further embodiment of the present invention.

In a further embodiment, as shown in FIG. 12H, computing step 810 includes a step 1282 of, if the span of the partition contains at least four coordinates, for each coordinate i such that MIN≦i≦MAX and if MIN+2≦i≦MAX−2 and i does not belong to the partition, connecting the first external port and the fourth external port (E1,E4) of the ith switch.

Alternative Switch Settings

In an exemplary embodiment, modifications to the setting switches might be required, depending on the hardware design of the computer. For example, it might be necessary to interchange the connections to ports I1 and I2 at certain switches. For example, if S contains exactly two coordinates, with i and i+1 being the two coordinates that belong to the span S, if i=1, the method and system adds connections (E3,I1) and (E1,I2), instead of (E3,I2) and (E1,I1).

Connecting Switches

Figure 13A:
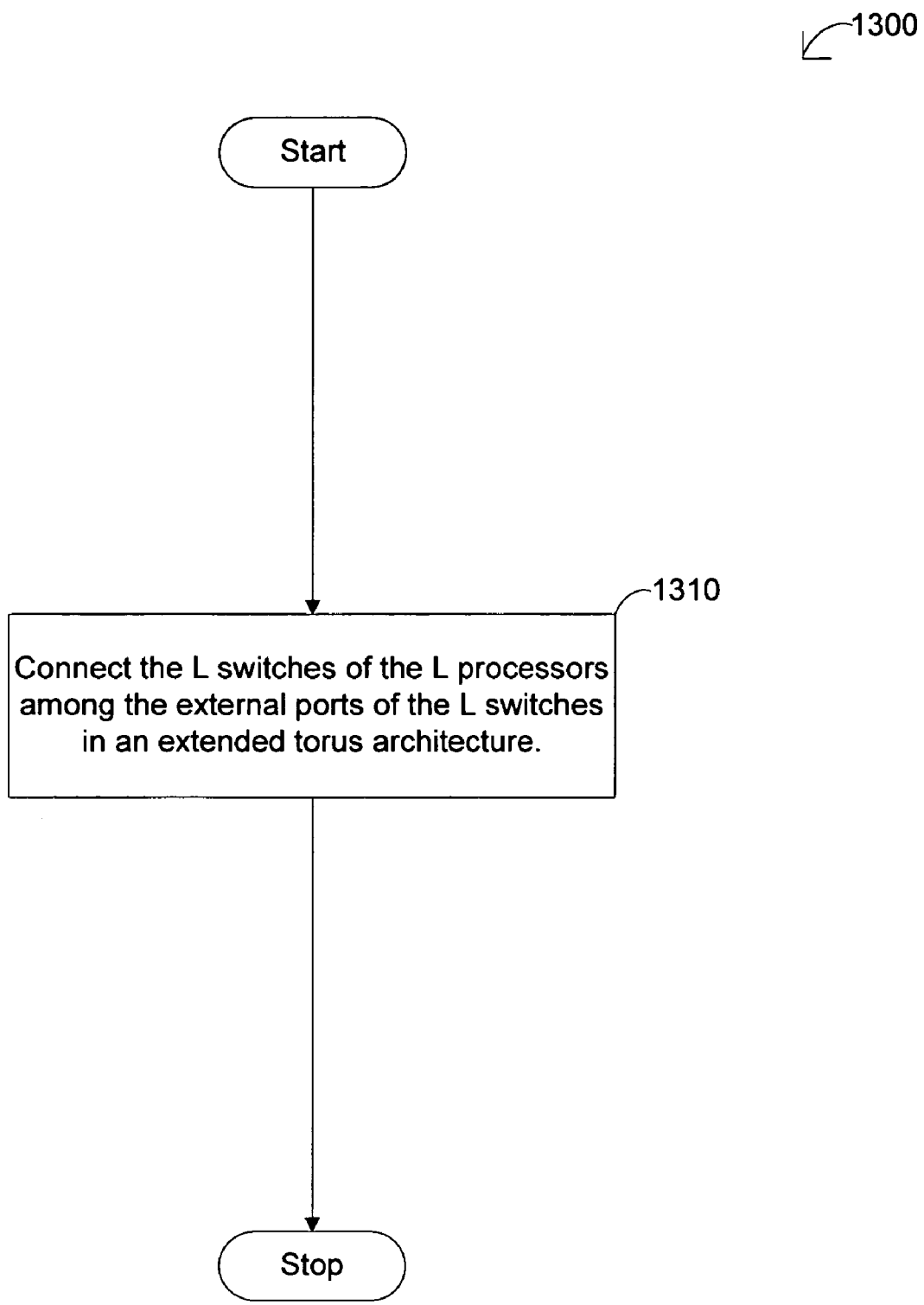
FIG. 13A is a flowchart in accordance with an exemplary embodiment of the present invention.
Figure 13B:
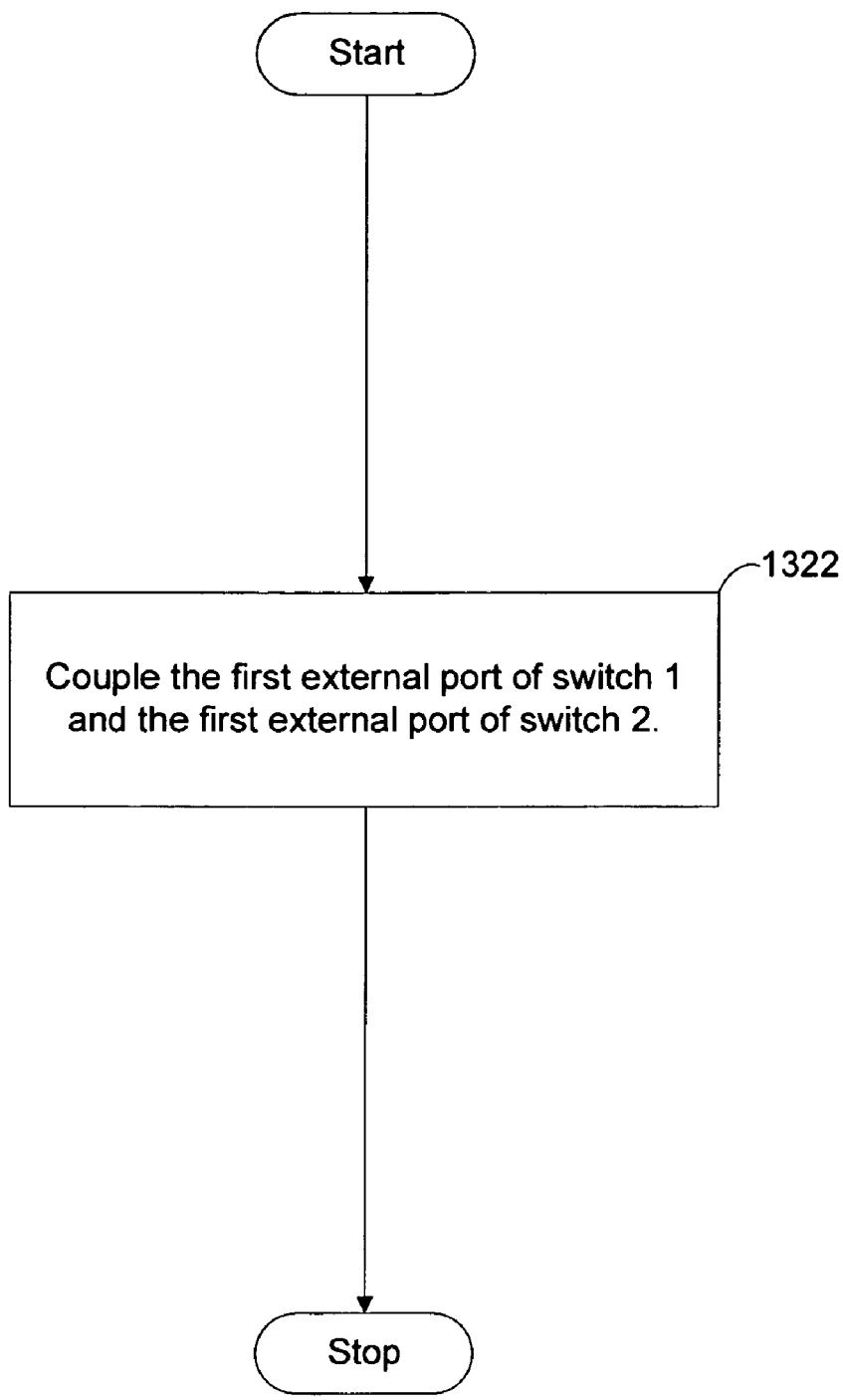
FIG. 13B is a flowchart of the connecting step in accordance with an exemplary embodiment of the present invention.
Figure 13C:
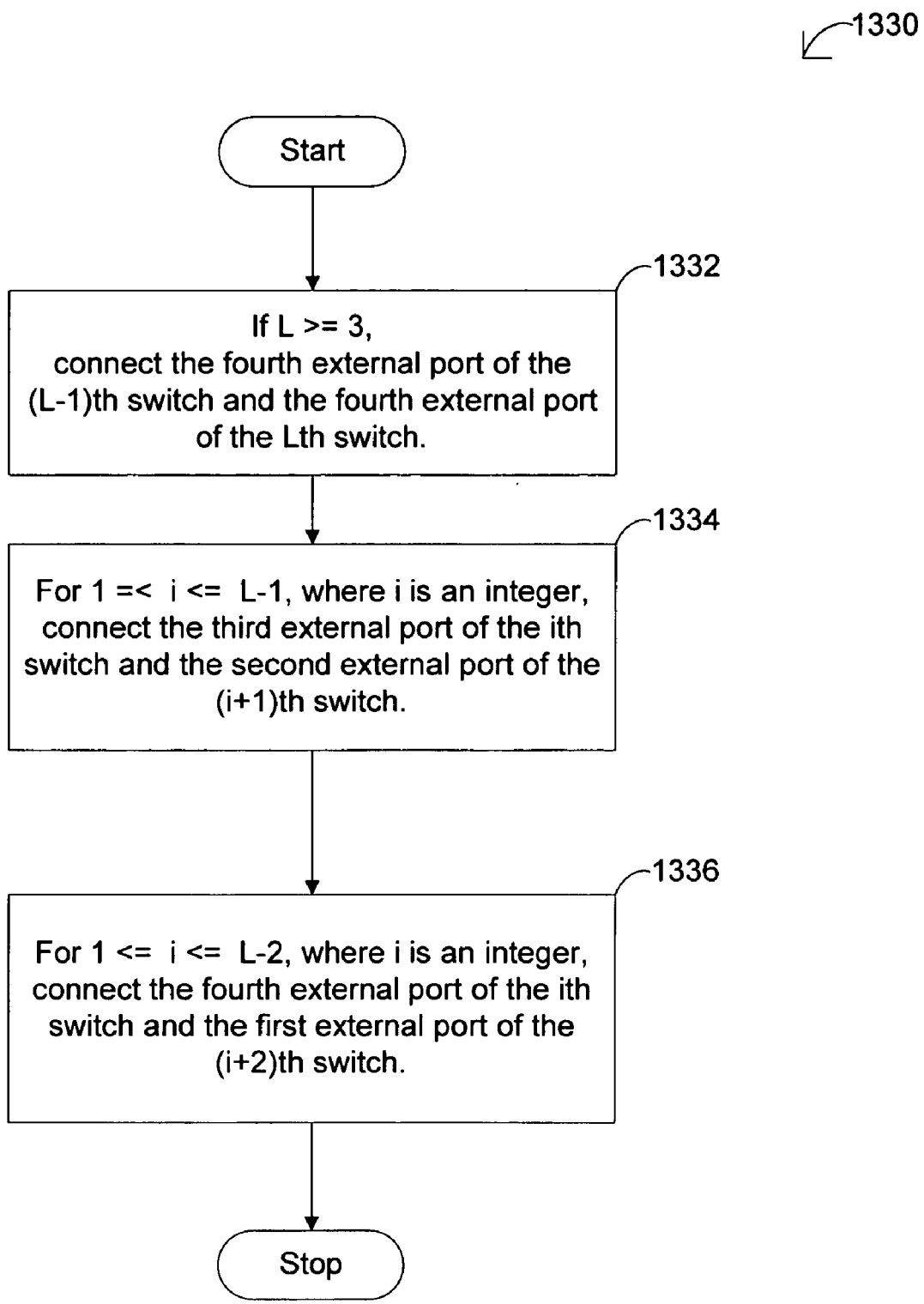
FIG. 13C is a flowchart of the connecting step in accordance with an exemplary embodiment of the present invention.
Figure 13D:
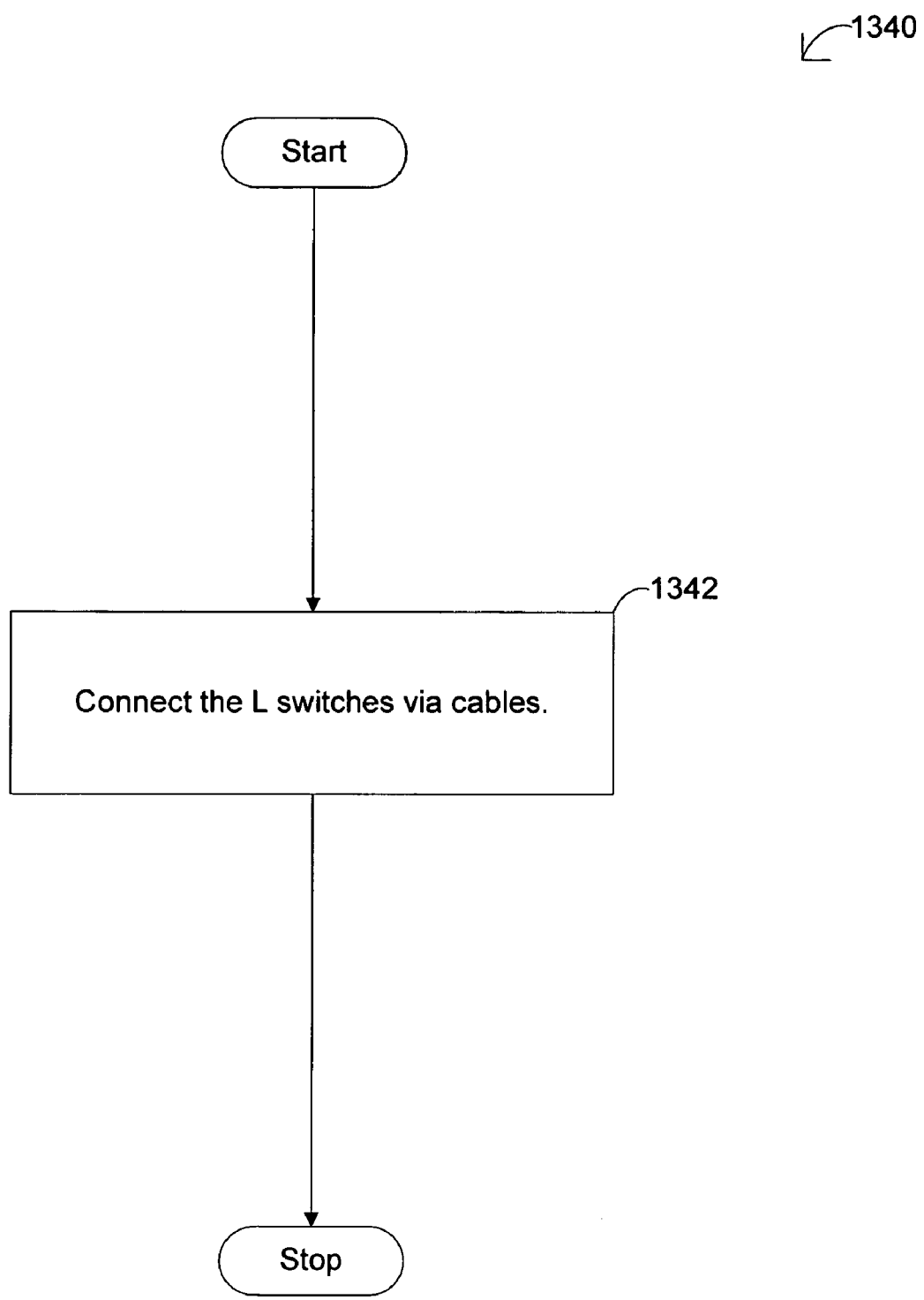
FIG. 13D is a flowchart of the connecting step in accordance with a particular embodiment of the present invention.
Figure 13E:
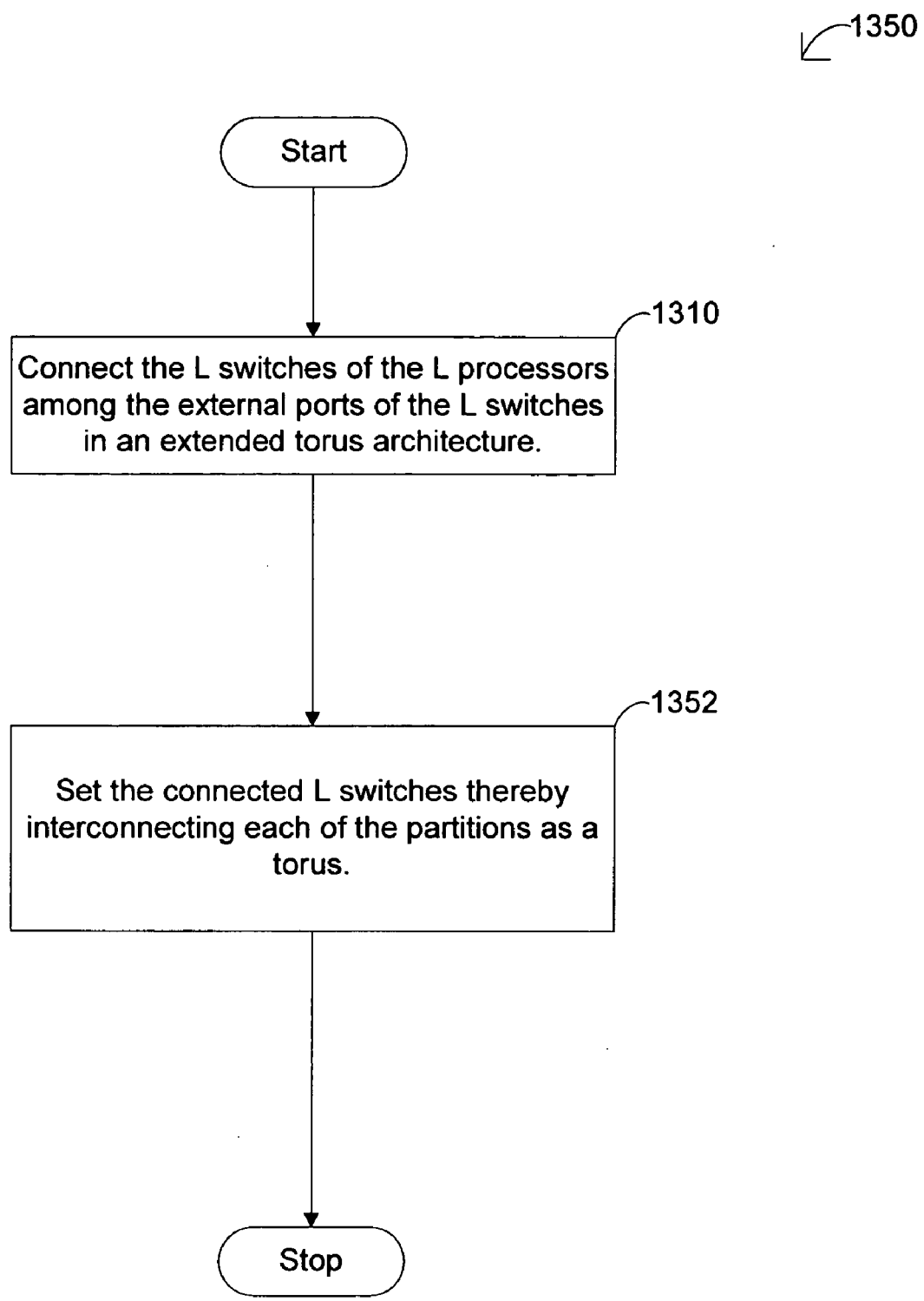
FIG. 13E is a flowchart in accordance with a further embodiment of the present invention.

Referring to FIG. 13A, in an exemplary embodiment, the present invention includes a step 1310 of connecting the L switches of the L processors among the external ports of the L switches in an extended torus architecture. Referring to FIG. 13B, in an exemplary embodiment, connecting step 1310 includes a step 1322 of coupling the first external port of switch 1 and the first external port of switch 2. In a further embodiment, as shown in FIG. 13C, connecting step 1310 includes a step 1332 of, if L≧3, connecting the fourth external port of the (L−1)th switch and the fourth external port of the Lth switch, a step 1334 of, for 1≦i≦L−1, where i is an integer, connecting the third external port of the ith switch and the second external port of the (i+1)th switch, and a step 1336 of, for 1≦i≦L−2, where i is an integer, connecting the fourth external port of the ith switch and the first external port of the (i+2)th switch. In a particular embodiment, as shown in FIG. 13D, connecting step 1310 includes a step 1342 of connecting the L switches via cables. In a further embodiment, as shown in FIG. 13E, the present invention includes a step 1352 of setting the connected L switches thereby interconnecting each of the partitions as a torus. In an exemplary embodiment, setting step 1352 comprises setting step 612.

Setting Switches

Figure 14:
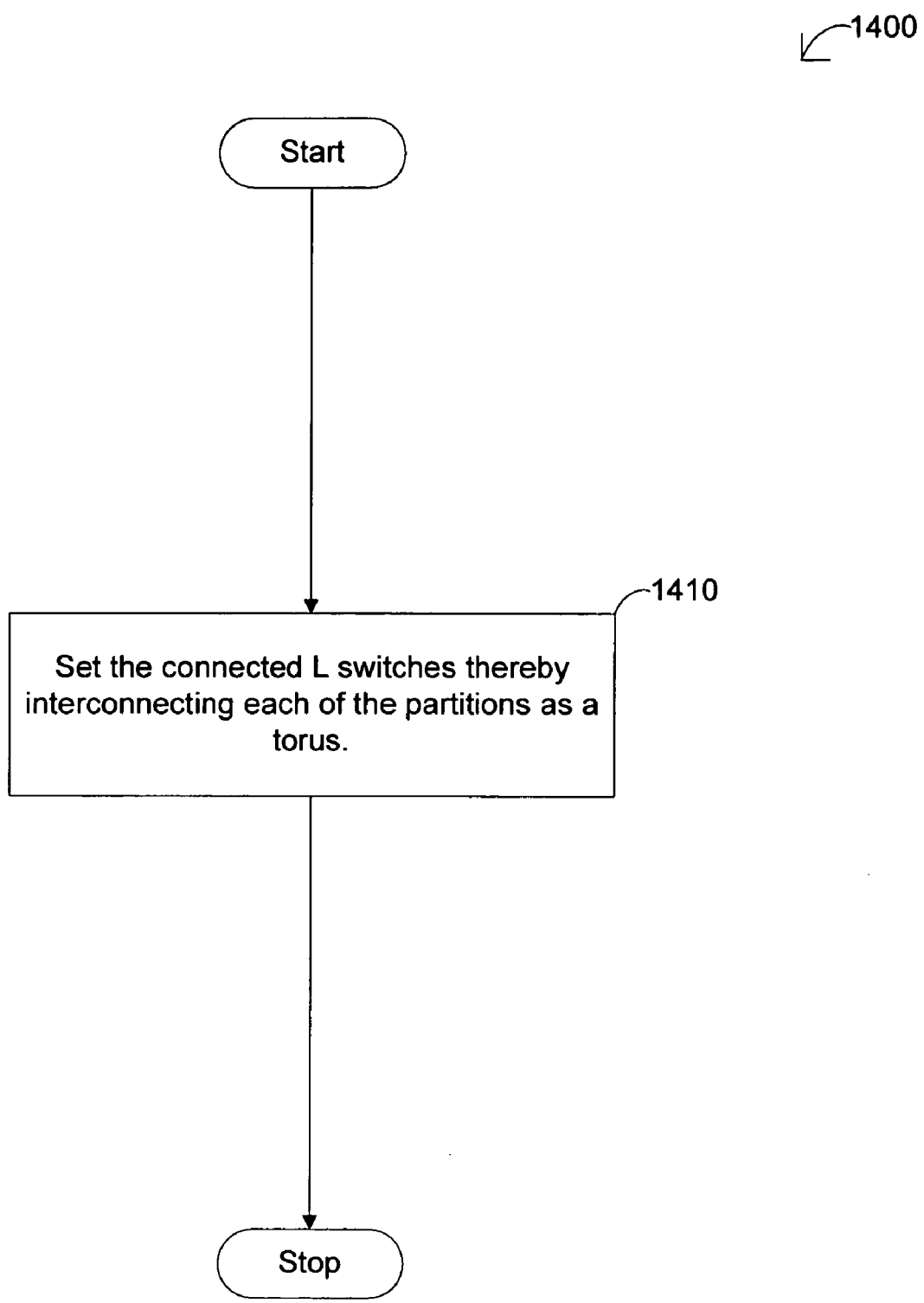
FIG. 14 is a flowchart in accordance with an exemplary embodiment of the present invention.

In an exemplary embodiment, the present invention provides a method and system of interconnecting L processors of a parallel computer to facilitate torus partitioning, (a) where each of the processors includes a processing unit and a switch, (b) where the switch includes a first external port, a second external port, a third external port, a fourth external port, a first internal port, and a second internal port, (c) where the L processors comprise R non-overlapping partitions, (d) where each of the partitions comprises the processing unit of at least one of the processors, (e) where L is an integer ≧2 and R is an integer ≧1, and (f) where the L switches of the L processors among the external ports of the L switches are connected in an extended torus architecture. Referring to FIG. 14, in an exemplary embodiment, the present invention includes a step 1410 of setting the connected L switches thereby interconnecting each of the partitions as a torus. In an exemplary embodiment, setting step 1410 comprises setting step 612.

Multi-Dimensional Arrays

Interconnecting Switches

In an exemplary embodiment, the method and system includes interconnecting switches in a n-dimensional array of processors having PUs and switches, where n is an integer greater than or equal to 2. For example for a n=3 dimensional array, the method and system (1) interconnects switches for one X-line, one Y-line, and one Z-line and (2) then replicates the resulting interconnections for all X-lines, all Y-lines, and all Z-lines of the array.

Setting Switches

In an exemplary embodiment, the setting switches applies to a n-dimensional array of processors having PUs and switches, where n is an integer greater than or equal to 2. Given a partition specified by $P_X$, $P_Y$, and $P_Z$, the method and system (1) applies setting switches with 1-dimensional partition $P_X$ to find the switch settings for all X-switches, (2) applies setting switches with 1-dimensional partition $P_Y$ to find the switch settings for all Y-switches, and (3) applies setting switches with 1-dimensional partition $P_Z$ to find the switch settings for all Z-switches.

In an exemplary embodiment, by setting switches for each individual partition in an arbitrary order for an arbitrary multiplicity M of non-overlapping partitions in a 3-dimensional array, the method and system set switches such that, for each individual partition P in M, the PUs belonging to P are interconnected as a 3-dimensional torus. In addition, in an exemplary embodiment, by setting switches for each individual partition in an arbitrary order for an arbitrary multiplicity M of non-overlapping partitions in a 3-dimensional array, for each individual partition P in M defined by sets $P_X$, $P_Y$, and $P_Z$ of size $N_X$, $N_Y$, and $N_Z$, respectively, and for each X-line of the partition, the method and system forms the torus architecture as follows:

(1) if $N_X=1$, then no external connections are used to form the torus interconnection of P in the X-line;

(2) if $P_X$ is an interval partition and if $N_X=2$, then at most three external connections are used to form the torus interconnection of P in the X-line, with Nx=2 being at most one more than the minimum possible number of external connections required to form a torus interconnection of P in the X-line; and (3) if $P_X$ is an interval partition and if $N_X \geq 3$, then at most $N_X$ external connections are used to form the torus interconnection of P in the X-line, with $N_X \geq 3$ being the minimum possible number of external connections required to form a torus interconnection of P in the X-line.

Dynamic Environment

It should be noted that the present invention can be applied in a dynamic environment where partitions may be formed and released at arbitrary times. With P1, P2, . . . , Pk denoting the partitions in M, the method and system (1) sets switches for P1 to obtain a set C1 of switch connections that realizes a torus interconnection of P1, (2) then, sets switches for P2 to obtain a set C2 of switch connections that realizes a torus interconnection of P2, where no connection in C2 uses a port of a switch that is also used by a connection in C1, where the connections in C2 can be made without interfering with any of the connections in C1, (3) then, sets switches for P3 to obtain a set C3 of switch connections that realizes a torus interconnection of P3, where no connection in C3 uses a port of a switch that is also used by a connection in either C1 or C2, where the connections in C3 can be made without interfering with any of the connections in C1 or C2, and (4) sets switches for similarly for the remaining partitions up to Pk.

In an exemplary embodiment, with P1, P2, . . . , Pk being a multiplicity of non-overlapping partitions, by setting switches thereby producing a set of switch connections realizing a torus interconnection of each individual partition and with P being any partition that does not overlap any of P1, P2, ..., Pk, the method and system obtains a set of switch connections realizing a torus interconnection of P that does not interfere with any of the switch connections obtained previously for P1, P2, ..., Pk.

In an exemplary embodiment, with a function f defined by $f(1)=0$, $f(2)=3$, and $f(N)=N$ for all $N \geq 3$ and if partition P is an interval partition that does not overlap any of P1, P2, ..., Pk, the method and system forms the torus interconnection of P with at most the following number of external connections:

f(NX) NY NZ+NX f(NY) NZ+NX NY f(NZ).

If neither $N_X$ nor $N_Y$ nor $N_Z$ equals 2, the method and system forms the torus interconnection of P with the minimum possible number of external connections required to form a torus interconnection of P.

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of interconnecting L processors of a parallel computer to facilitate torus partitioning, where each of the processors comprises a processing unit and a switch, where the switch comprises a first external port, a second external port, a third external port, a fourth external port, a first internal port, and a second internal port, where the L processors comprise R non-overlapping partitions, where each of the partitions comprises the processing unit of at least one of the processors, and where L is an integer $\geq 2$ and R is an integer $\geq 1$, the method comprising:
   connecting the L switches of the L processors among the external ports of the L switches in an extended torus architecture; and
   setting the connected L switches thereby interconnecting each of the partitions as a torus, wherein the setting comprises computing the span of the partition, wherein the computing comprises
   finding the minimum coordinate, MIN, in the partition,
   determining the maximum coordinate, MAX, in the partition,
   setting the span of the partition to be equal to the set of coordinates i, where $MIN \leq i \leq MAX$, where i is an integer,
   if the span of the partition contains exactly two coordinates, where i and i+1 are the two coordinates that belong to the span,
   if the span of the partition contains exactly two coordinates, where i and i+1 are the two coordinates that belong to the span,
   if i=1,
      connecting the third external port and the second internal port (E3,I2) of the first switch,
      connecting the first external port and the first internal port (E1,I1) of the first switch,
      connecting the second external port and the second internal port (E2,I2) of the second switch, and
      connecting the first external port and the first internal port (E1,I1) of the second switch;
   if i=L-1,
      connecting the third external port and the first internal port (E3,I1) of the (L-1)th switch,
      connecting the fourth external port and the second internal port (E4,I2) of the (L-1)th switch,
      connecting the second external port and the first internal port (E2,I1) of the Lth switch, and
      connecting the fourth external port and the second internal port (E4,I2) of the Lth switch; and
   otherwise, where $2 \leq i \leq L-2$,
      connecting the third external port and the fourth external port (E3,E4) of the (i-1)th switch,
      connecting the second external port and the first internal port (E2,I1) of the ith switch,
      connecting the third external port and the second internal port (E3,I2) of the ith switch,
      connecting the first external port and the first internal port (E1,I1) of the (i+1)th switch, and
      connecting the second external port and the second internal port (E2,I2) of the (i+1)th switch.

2. A method of interconnecting L processors of a parallel computer to facilitate torus partitioning, where each of the processors comprises a processing unit and a switch, where the switch comprises a first external port, a second external port, a third external port, a fourth external port, a first internal port, and a second internal port, where the L processors comprise R non-overlapping partitions, where each of the partitions comprises the processing unit of at least one of the processors, and where L is an integer $\geq 2$ and R is an integer $\geq 1$, the method comprising:
   connecting the L switches of the L processors among the external ports of the L switches in an extended torus architecture; and
   setting the connected L switches thereby interconnecting each of the partitions as a torus, wherein the setting comprises computing the span of the partition, wherein the computing comprises
   finding the minimum coordinate, MN, in the partition,
   determining the maximum coordinate, MAX, in the partition,
   setting the span of the partition to be equal to the set of coordinates i, where $MN \leq i \leq MAX$, where i is an integer,
   if the span of the partition contains exactly three coordinates, where i, i+1, and i+2 are the three coordinates that belong to the span,
   connecting the third external port and the first internal port (E3,I1) of the ith switch,
   connecting the fourth external port and the second internal port (E4,I2) of the ith switch,
   connecting the first external port and the first internal port (E1,I1) of the (i+2)th switch,
   connecting the second external port and the second internal port (E2,I2) of the (i+2)th switch;
   if (i+1) belongs to the partition,
      connecting the second external port and the first internal port (E2,I1) of the (i+1)th switch and
      connecting the third external port and the second internal port (E3,I2) of the (i+1)th switch; and
   if (i+1) does not belong to the partition,
      connecting the second external port and the third external port (E2,E3) of the (i+1)th switch.

3. A method of interconnecting L processors of a parallel computer to facilitate torus partitioning, where each of the processors comprises a processing unit and a switch, where the switch comprises a first external port, a second external port, a third external port, a fourth external port, a first internal port, and a second internal port, where the L processors comprise R non-overlapping partitions, where each of the partitions comprises the processing unit of at least one of the processors, and where L is an integer $\geq 2$ and R is an integer $\geq 1$, the method comprising:

connecting the L switches of the L processors among the external ports of the L switches in an extended torus architecture; and setting the connected L switches thereby interconnecting each of the partitions as a torus, wherein the setting comprises computing the span of the partition, wherein the computing comprises finding the minimum coordinate, MIN, in the partition, determining the maximum coordinate, MAX, in the partition, setting the span of the partition to be equal to the set of coordinates i, where MIN$\leq$i$\leq$MAX, where i is an integer, if the span of the partition contains at least four coordinates, for each coordinate i such that MIN$\leq$i$\leq$MAX, if i=MIN, connecting the third external port and the first internal port (E3,I1) of the ith switch and connecting the fourth external port and the second internal port (E4,I2) of the ith switch;

if i=MAX, connecting the first external port and the first internal port (E1,I1) of the ith switch and connecting the second external port and the second internal port (E2,I2) of the ith switch;

if i=MIN+1 and i belongs to the partition, connecting the second external port and the first internal port (E2,I1) of the ith switch and connecting the fourth external port and the second internal port (E4,I2) of the ith switch;

if i=MIN+1 and i does not belong to the partition, connecting the second external port and the fourth external port (E2,E4) of the ith switch;

if i=MAX-1 and i belongs to the partition, connecting the first external port and the first internal port (E1,I1) of the ith switch and connecting the third external port and the second internal port (E3,I2) of the ith switch;

if i=MAX-1 and i does not belong to the partition, connecting the first external port and the third external port (E1,E3) of the ith switch;

if MIN+2$\leq$i$\leq$MAX-2 and i belongs to the partition, connecting the first external port and the first internal port (E1,I1) of the ith switch and connecting the fourth external port and the second internal port (E4,I2) of the ith switch; and if MIN+2$\leq$i$\leq$MAX-2 and i does not belong to the partition, connecting the first external port and the fourth external port (E1,E4) of the ith switch.

4. A system of interconnecting L processors of a parallel computer to facilitate torus partitioning, where each of the processors comprises a processing unit and a switch, where the switch comprises a first external port, a second external port, a third external port, a fourth external port, a first internal port, and a second internal port, where the L processors comprise R non-overlapping partitions, where each of the partitions comprises the processing unit of at least one of the processors, and where L is an integer $\geq 2$ and R is an integer $\geq 1$, the system comprising:

a connecting module configured to connect the L switches of the L processors among the external ports of the L switches in an extended torus architecture; and a setting module configured to set the connected L switches thereby interconnecting each of the partitions as a torus, wherein the setting module comprises computing module configured to compute the span of the partition, wherein the computing module comprises a finding module configured to find the minimum coordinate, MIN, in the partition, a determining module configured to determine the maximum coordinate, MAX, in the partition, a setting module configured to set the span of the partition to be equal to the set of coordinates i, where MIN$\leq$i$\leq$MAX, where i is an integer, if the span of the partition contains exactly two coordinates, where i and i+1 are the two coordinates that belong to the span, if i=1, a first connecting module configured to connect the third external port and the second internal port (E3,I2) of the first switch, a second connecting module configured to connect the first external port and the first internal port (E1,I1) of the first switch, a third connecting module configured to connect the second external port and the second internal port (E2,I2) of the second switch, and a fourth connecting module configured to connect the first external port and the first internal port (E1,I1) of the second switch;

if i=L−1, a first connecting module configured to connect the third external port and the first internal port (E3,I1) of the (L−1)th switch, a second connecting module configured to connect the fourth external port and the second internal port (E4,I2) of the (L−1)th switch, a third connecting module configured to connect the second external port and the first internal port (E2,I1) of the Lth switch, and a fourth connecting module configured to connect the fourth external port and the second internal port (E4,I2) of the Lth switch; and otherwise, where 2$\leq$i$\leq$L−2, a first connecting module configured to connect the third external port and the fourth external port (E3, E4) of the (i−1)th switch, a second connecting module configured to connect the second external port and the first internal port (E2,I1) of the ith switch, a third connecting module configured to connect the third external port and the second internal port (E3,I2) of the ith switch, a fourth connecting module configured to connect the first external port and the first internal port (E1,I1) of the (i+1)th switch, and a fifth connecting module configured to connect the second external port and the second internal port (E2,I2) of the (i+1)th switch.

5. A system of interconnecting L processors of a parallel computer to facilitate torus partitioning, where each of the processors comprises a Processing unit and a switch, where the switch comprises a first external port, a second external port, a third external port, a fourth external port, a first internal port, and a second internal port, where the L processors comprise R non-overlapping partitions, where each of the partitions comprises the processing unit of at least one of the processors, and where L is an integer $\geq 2$ and R is an integer $\geq 1$, the system comprising:

a connecting module configured to connect the L switches of the L processors among the external ports of the L switches in an extended torus architecture; and a setting module configured to set the connected L switches thereby interconnecting each of the partitions as a torus, wherein the setting module comprises computing module configured to compute the span of the partition, wherein the computing module comprises a finding module configured to find the minimum coordinate, MN, in the partition, a determining module configured to determine the maximum coordinate, MAX, in the partition, a setting module configured to set the span of the partition to be equal to the set of coordinates i, where $MIN \leq i \leq MAX$, where i is an integer, if the span of the partition contains exactly three coordinates, where i, i+1, and i+2 are the three coordinates that belong to the span, a first connecting module configured to connect the third external port and the first internal port (E3,I1) of the ith switch, a second connecting module configured to connect the fourth external port and the second internal port (E4,I2) of the ith switch, a third connecting module configured to connect the first external port and the first internal port (E1,I1) of the (i+2)th switch, a fourth connecting module configured to connect the second external port and the second internal port (E2, I2) of the (i+2)th switch;

if (i+1) belongs to the partition, a fifth connecting module configured to connect the second external port and the first internal port (E2,I1) of the (i+1)th switch and a sixth connecting module configured to connect the third external port and the second internal port (E3,I2) of the (i+1)th switch; and if (i+1) does not belong to the partition, a fifth connecting module configured to connect the second external port and the third external port (E2,E3) of the (i+1)th switch.

6. A system of interconnecting L processors of a parallel computer to facilitate torus partitioning, where each of the processors comprises a processing unit and a switch, where the switch comprises a first external port, a second external port, a third external port, a fourth external port, a first internal port, and a second internal port, where the L processors comprise R non-overlapping partitions, where each of the partitions comprises the processing unit of at least one of the processors, and where L is an integer $\geq 2$ and R is an integer $\geq 1$, the system comprising:

a connecting module configured to connect the L switches of the L processors among the external Ports of the L switches in an extended torus architecture; and a setting module configured to set the connected L switches thereby interconnecting each of the partitions as a torus, wherein the setting module comprises computing module configured to compute the span of the partition, wherein the computing module comprises a finding module configured to find the minimum coordinate, MIN, in the partition, a determining module configured to determine the maximum coordinate, MAX, in the partition, a setting module configured to set the span of the partition to be equal to the set of coordinates i, where $MIN \leq i \leq MAX$, where i is an integer, if the span of the partition contains at least four coordinates, for each coordinate i such that $MIN \leq i \leq MAX$, if i=MIN, a first connecting module configured to connect the third external port and the first internal port (E3,I1) of the ith switch and a second connecting module configured to connect the fourth external port and the second internal port (E4,I2) of the ith switch;

if i=MAX, a first connecting module configured to connect the first external port and the first internal port (E1,I1) of the ith switch and a second connecting module configured to connect the second external port and the second internal port (E2,I2) of the ith switch;

if i=MIN+1 and i belongs to the partition, a first connecting module configured to connect the second external port and the first internal port (E2,I1) of the ith switch and a second connecting module configured to connect the fourth external port and the second internal port (E4,I2) of the ith switch;

if i=MIN+1 and i does not belong to the partition, a connecting module configured to connect the second external port and the fourth external port (E2,E4) of the ith switch;

if i=MAX−1 and i belongs to the partition, a first connecting module configured to connect the first external port and the first internal port (E1,I1) of the ith switch and a second connecting module configured to connect the third external port and the second internal port (E3,I2) of the ith switch;

if i=MAX−1 and i does not belong to the partition, a connecting module configured to connect the first external port and the third external port (E1,E3) of the ith switch;

if $MIN+2 \leq i \leq MAX-2$ and i belongs to the partition, a first connecting module configured to connect the first external port and the first internal port (E1,I1) of the ith switch and a second connecting module configured to connect the fourth external port and the second internal port (E4,I2) of the ith switch; and if $MIN+2 \leq i \leq MAX-2$ and i does not belong to the partition, a connecting module configured to connect the first external port and the fourth external port (E1,E4) of the ith switch.

* * * * *